(12) United States Patent
Ady et al.

(10) Patent No.: US 10,791,429 B2
(45) Date of Patent: Sep. 29, 2020

(54) COMMUNICATING LOCATION CHANGE INFORMATION IN ACCORDANCE WITH A REPORTING APPROACH

(71) Applicant: JIO, Inc., Chicago, IL (US)

(72) Inventors: Roger W. Ady, Chicago, IL (US); Adam John Kusey, Chicago, IL (US); Makarand Manohar Karvekar, Glenview, IL (US); David Edward Stude, Barrington, IL (US); Justin Douglas Eltoft, Pleasant Prairie, WI (US); Ivan Kolotov, Mountain View, CA (US); Bharat Sunkavally, Pleasonton, CA (US); Peter Gene Jansons, Elburn, IL (US)

(73) Assignee: JIO, Inc., Chicago, IL (US)

( * ) Notice: Subject to any disclaimer, the term of this patent is extended or adjusted under 35 U.S.C. 154(b) by 0 days.

(21) Appl. No.: 16/591,008

(22) Filed: Oct. 2, 2019

(65) Prior Publication Data

US 2020/0037115 A1 Jan. 30, 2020

Related U.S. Application Data

(63) Continuation-in-part of application No. 16/233,618, filed on Dec. 27, 2018, now Pat. No. 10,448,215, (Continued)

(51) Int. Cl.
*H04W 4/029* (2018.01)
*H04W 40/24* (2009.01)
(Continued)

(52) U.S. Cl.
CPC ......... *H04W 4/029* (2018.02); *H04L 47/6215* (2013.01); *H04W 4/20* (2013.01); *H04W 40/242* (2013.01)

(58) Field of Classification Search
None
See application file for complete search history.

(56) References Cited

U.S. PATENT DOCUMENTS 5,652,571 A 7/1997 Shima
6,414,635 B1 7/2002 Stewart
(Continued)

*Primary Examiner* — Ernest G Tacsik
(74) *Attorney, Agent, or Firm* — Garlick & Markison; Timothy W. Markison; Gary W. Grube

(57) ABSTRACT

A method includes generating location change information of a computing device in accordance with a location resolution level of a reporting approach and sending the location change information to another computing device in accordance with a location reporting frequency of the reporting approach. The method further includes detecting geo-activity change of the computing device and updating the reporting approach based on the geo-activity change to produce an updated location resolution level and an updated location reporting frequency. The method further includes generating further location change information of the computing device in accordance with the updated location resolution level and sending the further location change information to the other computing device in accordance with the updated location reporting frequency.

12 Claims, 19 Drawing Sheets

Related U.S. Application Data which is a continuation-in-part of application No. 15/630,718, filed on Jun. 22, 2017, now Pat. No. 10,172,109.

(60) Provisional application No. 62/354,523, filed on Jun. 24, 2016.

(51) Int. Cl.
*H04W 4/20* (2018.01)
*H04L 12/863* (2013.01)

(56) References Cited

U.S. PATENT DOCUMENTS

| | | | |
|---|---|---|---|
| 6,920,576 B2 | 7/2005 | Ehmann | |
| 7,085,950 B2 | 8/2006 | Ehmann | |
| 7,117,370 B2 | 10/2006 | Khan | |
| 8,130,761 B2 | 3/2012 | Winter | |
| 8,624,725 B1* | 1/2014 | MacGregor | H04W 12/06 340/539.13 |
| 8,670,770 B2 | 3/2014 | Fitzgerald | |
| 9,264,843 B2 | 2/2016 | Huang | |
| 9,642,529 B1 | 5/2017 | Siddiqui | |
| 9,681,259 B1 | 6/2017 | Ortega | |
| 9,870,715 B2 | 1/2018 | Sadeh-Koniecpol | |
| 2004/0185870 A1* | 9/2004 | Matsuda | H04W 64/00 455/456.1 |
| 2004/0229564 A1 | 11/2004 | Huang | |
| 2007/0026871 A1* | 2/2007 | Wager | H04L 67/20 455/456.1 |
| 2008/0040023 A1 | 2/2008 | Breed | |
| 2009/0047972 A1 | 2/2009 | Neeraj | |
| 2009/0100145 A1 | 4/2009 | Szeto | |
| 2010/0151887 A1 | 6/2010 | Bobier | |
| 2010/0299060 A1 | 11/2010 | Snavely | |
| 2010/0325194 A1 | 12/2010 | Williamson | |
| 2011/0106736 A1 | 5/2011 | Aharonson | |
| 2013/0252591 A1 | 9/2013 | Sasaki | |
| 2014/0003373 A1 | 1/2014 | Hakola | |
| 2016/0049014 A1 | 2/2016 | Wells | |
| 2017/0104872 A1 | 4/2017 | Ristock | |
| 2017/0164332 A1 | 6/2017 | Kim | |
| 2017/0332192 A1 | 11/2017 | Edge | |

* cited by examiner

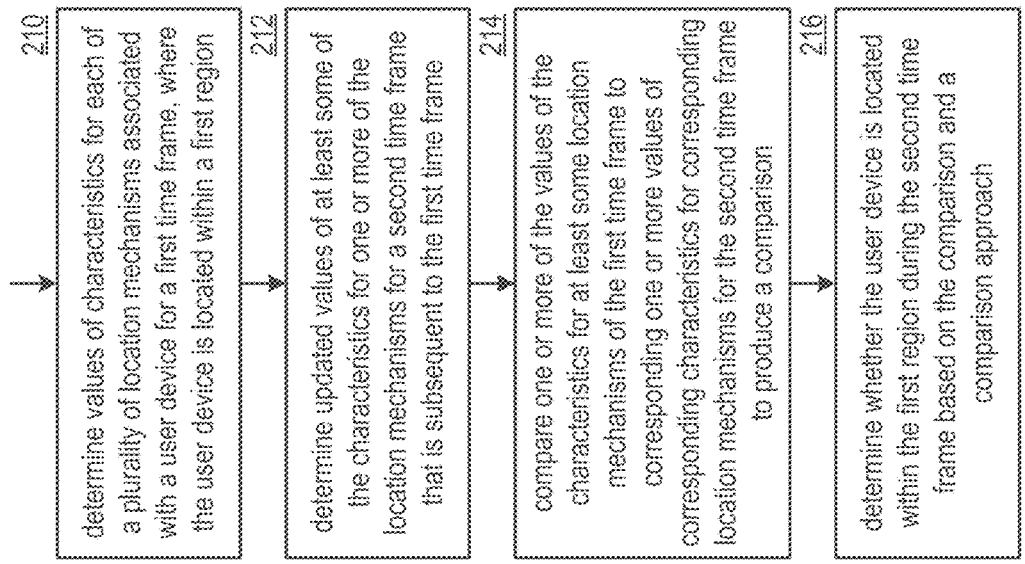

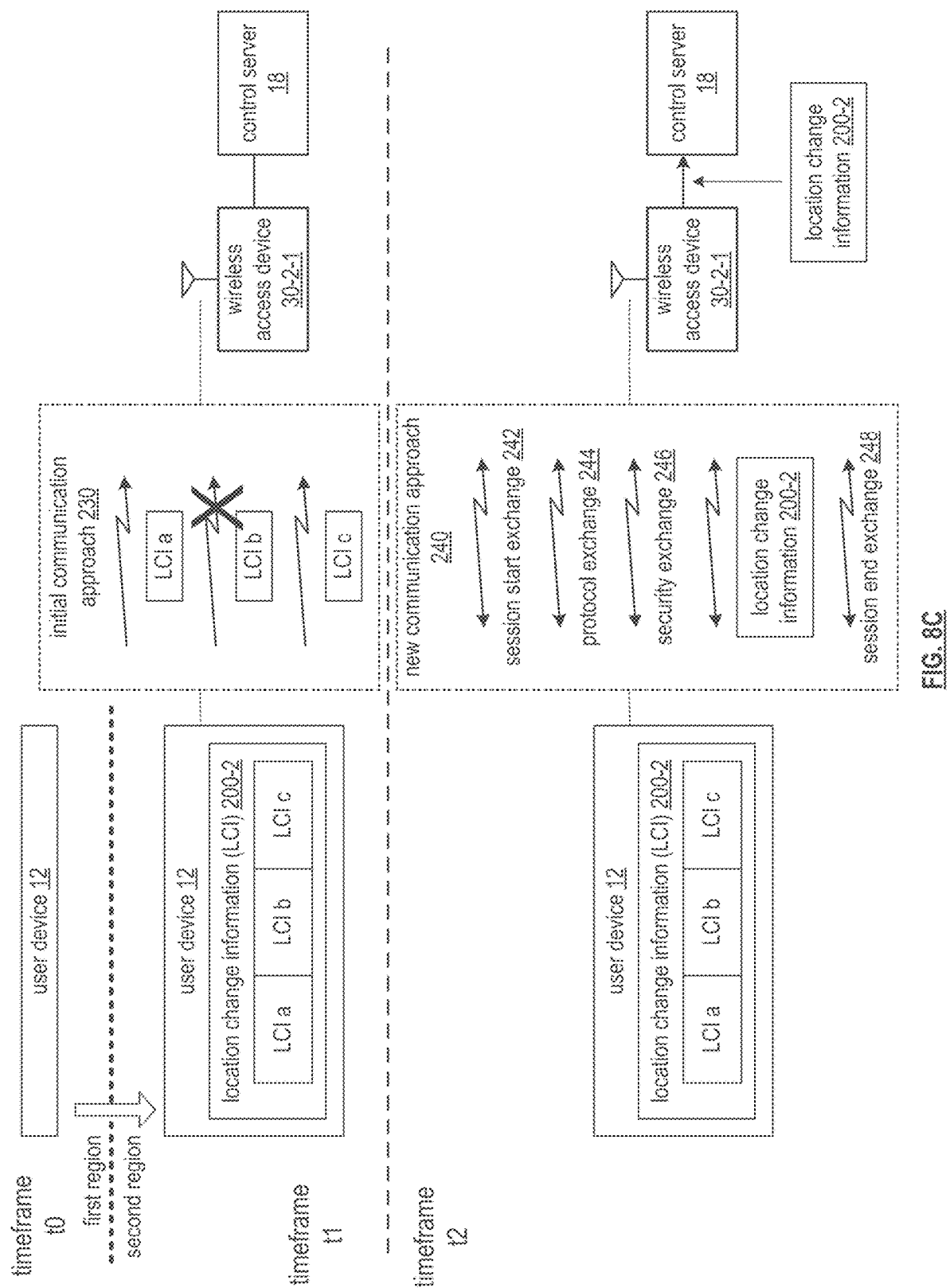

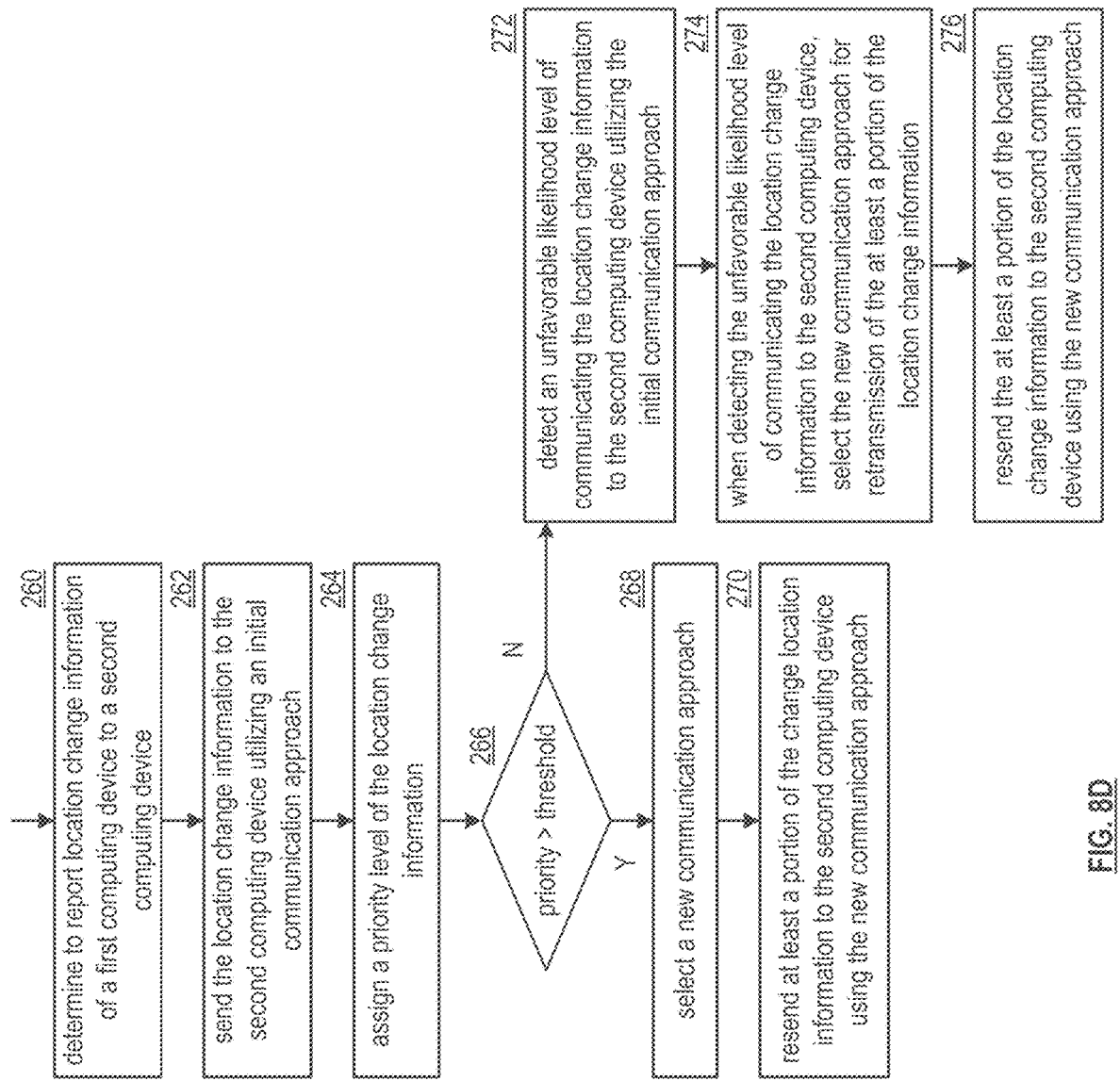

COMMUNICATING LOCATION CHANGE INFORMATION IN ACCORDANCE WITH A REPORTING APPROACH

CROSS REFERENCE TO RELATED PATENTS

The present U.S. Utility patent application claims priority pursuant to 35 U.S.C. § 120 as a continuation in part of U.S. Utility application Ser. No. 16/233,618, entitled "COMMUNICATING LOCATION CHANGE INFORMATION," filed Dec. 27, 2018, issuing as U.S. Pat. No. 10,448,215 on Oct. 15, 2019, which claims priority pursuant to 35 U.S.C. § 120 as a continuation in part of U.S. Utility application Ser. No. 15/630,718, entitled "SYNCHRONIZING LOCATION STATUS INFORMATION IN A COMPUTING SYSTEM," filed Jun. 22, 2017, issued as U.S. Pat. No. 10,172,109, on Jan. 1, 2019, which claims priority pursuant to 35 U.S.C. § 119(e) to U.S. Provisional Application No. 62/354,523, entitled "SYNCHRONIZING LOCATION STATUS INFORMATION IN A COMPUTING SYSTEM," filed Jun. 24, 2016, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to development of location context information for utilization by location driven functions of the computing systems.

Description of Related Art

The use of location information by location driven functions of computing systems is well known, where location information includes one or more of an absolute location (e.g., a global positioning satellite (GPS) derived location) and a relative location (e.g., with respect to a known location). Location driven functions includes a wide variety of applications including navigational aids (e.g., routes for driving, bicycling, walking, etc.), service delivery aids (e.g., vehicle route optimization, schedule adherence, etc.), retail shopping aids (e.g., proximity of available product, etc.), and safety and security aids (e.g., motorist assist, personal assist, asset tracking, people tracking, etc.).

The computing systems are known to include computing devices. Examples of the computing devices includes a smart phone, a tablet computer, a laptop computer, a vehicular computing device, a data storage server, and a data processing server. Basically, any device that includes a computing unit, one or more interfaces, and a memory system may be deemed as a computing device.

As is further known, the computing devices may be utilized to obtain location information associated with a particular computing device. In a self-determination approach, a computing device may determine location information associated with the computing device. In an assisted-determination approach, other computing devices may determine the location information associated with the computing device.

The self-determination approaches include receiving GPS signals and determining the location information, mapping received Wi-Fi hotspot identifiers to produce the location information, and mapping received Bluetooth beacon identifiers to produce the location information. The assisted-determination approaches include receiving wireless signals from the computing device (e.g., cellular, Wi-Fi, radiofrequency identifier (RFID) tag, Bluetooth, etc.) and analyzing the wireless signals utilizing a signal analysis approach. Signal analysis approaches include time of arrival, time difference of arrival, relative signal strength, triangulating utilizing a plurality of received wireless signals, and analysis of wireless network registration and site handover information (e.g., cellular site registration, cellular signal and timing metrics, Wi-Fi hotspot affiliation, etc.)

The location determining approaches are known to be associated with particular geographic regions and limitations. Examples of the geographic regions includes outdoors-centric with limited indoors and in-vehicle availability (e.g., GPS, other satellite-based location systems) and indoors-centric with limited location accuracy and limited availability (e.g., proximity to one or more Wi-Fi hotspots or Bluetooth beacons). Despite advances in location technologies, is widely recognized that there is not a single location technology to fit all applications (e.g., broad coverage of all geographic regions of interest).

It is well-known that communication of the location information to the location driven functions may be carried out by an associated communication technology and/or an adjunct communication technology. For example, a Wi-Fi message is the associated communication technology when the Wi-Fi hotspot identifier is utilized to produce the location information. As another example, a cellular communication system message is the adjunct communication technology when the GPS signals are utilized to produce the location information. Despite advances in communication technology, it is widely recognized that there is not a single communication technology to provide the communication of the location information in light of other desires beyond the communication of the location information (e.g., battery life of a portable computing device, network charges, equipment costs, indoor vs. outdoors, etc.).

JIO, Inc. introduced a computing system that utilizes unique combinations of location information determination and communication of the location information to the location driven functions to favorably support achieving requirements associated with equipment costs, network costs, location accuracy, location availability, user device size, and user device battery life. In particular, the computing system enables cost-effective tracking of a personal user device, where the personal user device has a very desirable form factor and battery life to promote ease-of-use and overall greater utility.

BRIEF DESCRIPTION OF THE SEVERAL VIEWS OF THE DRAWING(S)

FIG. 7B is a logic diagram of an embodiment of a method of detecting a user device geographic region change in a computing system in accordance with the present invention;

FIGS. 8A-8C are schematic block diagrams of another embodiment of a computing system in accordance with the present invention;

FIG. 8D is a logic diagram of an embodiment of a method of communicating location change information change in a computing system in accordance with the present invention;

DETAILED DESCRIPTION OF THE INVENTION

Figure 1:
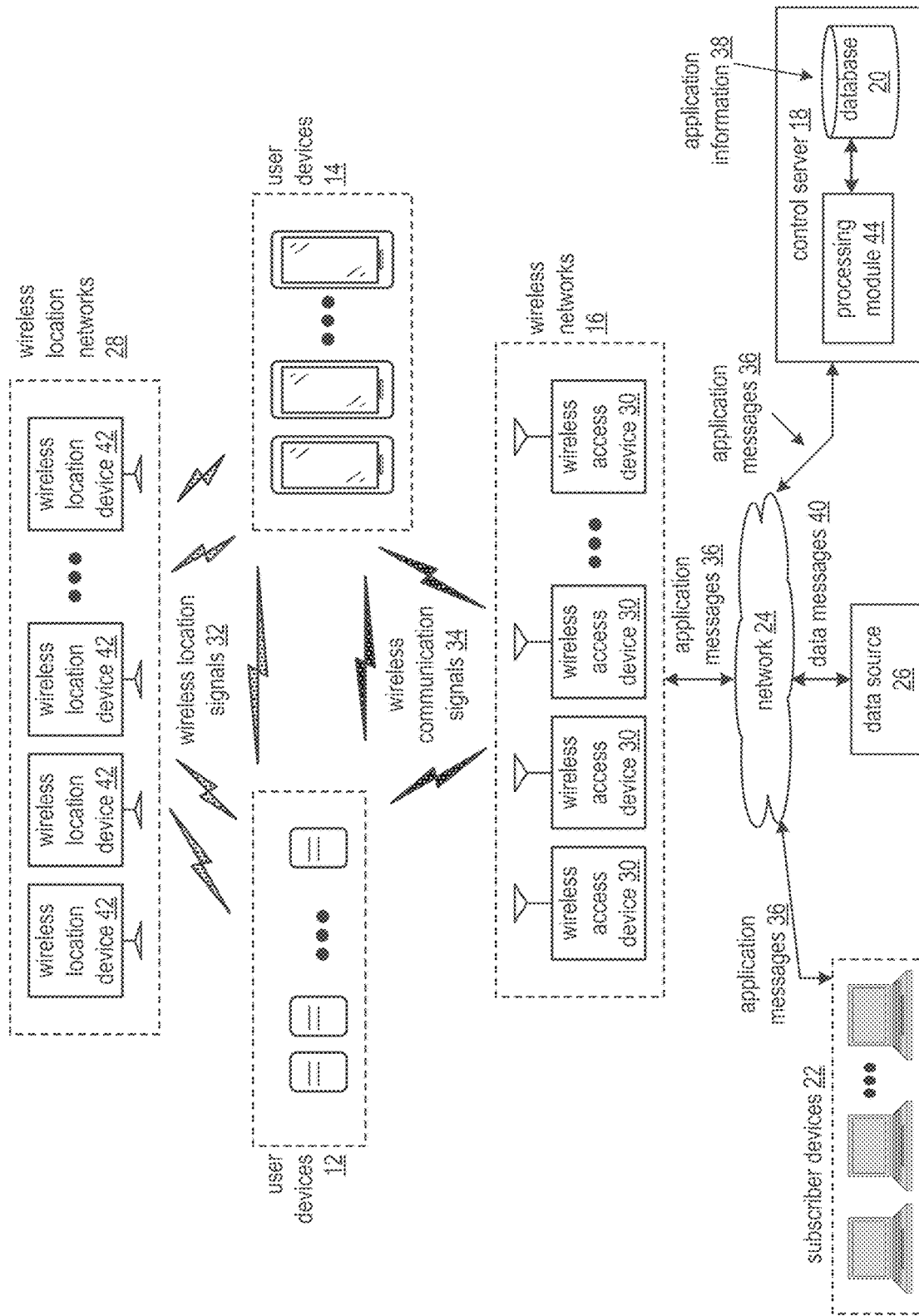
FIG. 1 is a schematic block diagram of an embodiment of a computing system in accordance with the present invention.

FIG. 1 is a schematic block diagram of an embodiment of a computing system 10 that includes wireless location networks 28, user devices 12, user devices 14, a wireless network 16, a control server 18, subscriber devices 22, a network 24, and a data source 26. The wireless location networks 28 includes a plurality of wireless location devices 42 that communicate wireless location signals 32 with the user devices 12 and 14. Each wireless location device 42 may be implemented utilizing one or more of a portion of a global positioning satellite (GPS) satellite constellation, a portion of a private location service, a wireless local area network (WLAN) access point, a Bluetooth (BT) beacon and/or communication unit, and a radiofrequency identifier (RFID) tag and/or transceiver. Each wireless location device 42 generates and transmits the wireless location signals 32 in accordance with one or more wireless location industry standards (e.g., including synchronize timing information (i.e., GPS), and a geographic reference identifier (ID) (i.e., a beacon ID, a MAC address, an access point ID such as a wireless local area network SSID)).

The user devices 12 includes one or more user devices 12, where each user device 12 may be implemented utilizing one or more portable computing devices. Examples of portable computing devices includes an embedded clothing package, an asset tracking package, a computer dongle, embedded vehicular electronics, a smart phone, a tablet computer, a laptop, a handheld computer, and/or any other device that includes a computing core and is capable of operating in a portable mode untethered from a fixed and/or wired network. For example, a particular user device 12 is implemented utilizing the embedded clothing package, where the embedded clothing package is designed for ease of use within clothing (e.g., small size, lightweight, etc.). At least some of the user devices 12 may be capable to transmit the wireless location signals 32 to other user devices 12 and/or to at least some of the user devices 14.

The user devices 14 includes one or more user devices 14, where each user device 14 may be implemented utilizing one or more portable computing devices. For example, a particular user device 14 is implemented utilizing the smart phone, where the smart phone is designed for a wide variety of functionality (e.g., medium size, battery capacity to supply a color display and frequent wireless communications, etc.). At least some of the user devices 14 may be capable to transmit the wireless location signals 32 to the user devices 12 and/or to other user devices 14.

The wireless network 16 includes a plurality of wireless access devices 30. Each wireless access device 30 may be implemented utilizing one or more of a portion of a wireless communication network. Each wireless communications network includes one or more of a public wireless communication system and a private wireless communication system and may operate in accordance with one or more wireless industry standards including universal mobile telecommunications system (UMTS), global system for mobile communications (GSM), long term evolution (LTE), wideband code division multiplexing (WCDMA), and IEEE 802.11. For example, a first wireless access device 30 is implemented utilizing a base station of a LTE cellular network and a second wireless access device 30 is implemented utilizing a wireless LAN access point.

Each wireless communication network sends wireless communications signals 34 to the user devices 12 and 14 and receives wireless communications signals 34 from the user devices 12 and 14 to communicate application messages 36. The wireless communication signals 34 includes encoded forms of application messages 36 in accordance with the one or more wireless industry standards. The application messages 36 includes instructions and/or data associated with one or more location driven functions to be processed by one or more computing devices of the computing system 10. The user devices 12 and 14 may send and receive the wireless communications signals 34 directly between two or more user devices 12 and 14.

The components of the computing system 10 are coupled via the network 24, which may include one or more of wireless and/or wireline communications systems, one or more private communications systems, a public Internet system, one or more local area networks (LAN), and one or more wide area networks (WAN). For example, the network 24 is implemented utilizing the Internet to provide connectivity between the wireless network 16, the subscriber devices 22, the data source 26, and the control server 18.

The control server 18 includes at least one processing module 44 and a database 20. The processing module 44 processes the application messages 36 and maintain storage of application information 38 within the database 20. The application information includes one or more of user account information, user device recommendations, user device configuration information, and user device status information (e.g., information associated with one or more user devices 12 and 14). The user account information includes one or more of IDs, permissions, affinity relationships of individuals and groups, and privacy requirements. The user device recommendations include one or more of a location synchronization approach, a location determination approach, and a communications path approach (e.g., requirements, recommended identifiers of computing devices associated with wireless communication, recommended power levels, recommended paths).

The user device configuration includes one or more of a reporting mode (e.g., autonomous, when requested, by exception, scheduled), reporting triggers, location format, status type reporting, required sensor data, wireless network list, other user device list, a wireless location network list, power consumption goals, backhaul assist limits for others, landmark information, geographic fence information, affiliated user device identifiers, etc. The user device status information includes one or more of a user ID, a user device ID, a location (e.g., absolute, relative, coordinates, address, etc.), an availability level, a user device battery remaining energy level, an average power consumption level, a schedule adherence indicator, a health indicator, and an emergency indicator.

The subscriber devices 22 includes one or more subscriber devices 22, where each subscriber device 22 may be implemented utilizing one or more of a portable computing device and a fixed computing device (e.g., a desktop computer, a cable television set-top box, an application server, an internet television user interface and/or any other fixed device that includes a computing device). Such a portable or fixed computing device may include one or more of a computing core (e.g., providing processing module functionality), one or more wireless modems, sensors, and one or more user interfaces. The subscriber device 22 communicates application messages 36 with the control server 18 and one or more of the user devices 12 and 14. For example, the subscriber device 22 obtains and processes the status information from the user device 12.

The data source 26 may be implemented utilizing one or more of a server, a subscription service, a website data feed, or any other portal to data messages 40 that provide utility for synchronization of the status information between the user device 12 and the subscriber device 22. Examples of the data source 26 includes one or more of a weather service, a screen scraping algorithm, a website, another database, a schedule server, a live traffic information feed, an information server, a service provider, and a data aggregator. The data messages 40 includes one or more of weather information, a user daily activity schedule (e.g., a school schedule, a work schedule, a delivery schedule, a public transportation schedule), real-time traffic conditions, a road construction schedule a community event schedule, a community event schedule, and other schedules associated with a user.

In general, and with respect to the synchronizing of status information between the user device 12 and the subscriber device 22 (e.g., providing current status information of the user device 12 within a desired time frame to the subscriber device 22), the computing system 10 supports four primary functions. The four primary functions includes determining an approach to the synchronizing of the status information (e.g., determining a location synchronization approach, determining a location determination approach), generating the status information (e.g., determining a current location of the user device 12, generating location synchronization information as the status information to include the current location), identifying a communication path to communicate the status information from the user device 12 to the subscriber device 22, and communicating the status information from the user device 12 to the subscriber device 22 utilizing the communication path.

The first primary function includes the computing system 10 determining the approach to synchronize the status information. In an example of operation of the determining the approach to synchronize the status information, the user device 12 obtains a location synchronization approach. The location synchronization approaches include performing regularly scheduled updates, by exception (i.e., off schedule, outside of a particular geographic region, movement, motion pattern trigger, emergency trigger), transport mode (i.e., walk, bicycle, car, air), when in proximity to a waypoint, when in proximity, or not, to a particular assisting entity (i.e., a user device 14 that can help with location determination and communication), upon request, when a location determination approach exceeds a high threshold level of expected performance (i.e., very low power required to gather and report location), proximity to other known user devices 12.

The obtaining of the location synchronization approach may be based on one or more of a predetermination, guidance from the subscriber device, a current location, a current status of the user device 12 (i.e., needs help, normal). For example, the user device 12 determines to synchronize the status information when detecting an unfavorable schedule adherence (e.g., a current location is ahead or behind a predetermined schedule). Alternatively, the processing module 44 determines the approach to synchronize the status information.

Having obtained the location synchronization approach, the user device 12 obtains a location determination approach. The location determination approach includes one or more of autonomously determining a current location, facilitating an assisted approach utilizing other computing devices of the computing system 10, one or more technology types (e.g., GPS, SSID, beacon, MAC address), and utilizing a last known location. The obtaining may be based on one or more of the location synchronization approach, availability of one or more location assets (e.g., to assist), requirements of the location determination approach (e.g., accuracy level, relative location versus absolute location, power requirements, priority level), a predetermination, and interpretation of guidance from the subscriber device 22, and selecting an approach that produces location information most favorably in accordance with the requirements.

For example, the user device 12 determines to utilize GPS location information from a user device 14 when detecting proximity of the user device 14 and where the user device 14 generates acceptable location information. Alternatively, the processing module 44 determines the location determination approach.

The second primary function includes the computing system 10 generating the status information. In an example of operation of the generating of the status information, the user device 12 interprets wireless location signals 32 from the wireless location networks 28 to produce an absolute location associated with the user device 12 (e.g., a GPS-based location), interprets a user input to produce a status associated with a user of the user device (e.g., I'm okay pushbutton), and produces the status information to include the status associated with the user and the absolute location associated with the user device.

As another example, the user device 12 interprets at least one of a wireless location signal 32 from a user device 14 and a wireless communication signal 34 from the user device 14 to produce a relative location association between the user device 14 and with the user device 12 (e.g., within a Bluetooth and/or Wi-Fi range proximity of the user device 14, based on signal strength, an absolute GPS location of the user device 14). The user device 12 further interprets the user input to produce the status associated with the user and produces the status information to include the status associated with the user and the relative location.

As yet another example of the generating of the status information, the user device 12 interprets another wireless location signal 32 from a wireless location device 42 to produce a relative location associated with the wireless location device 42 (e.g., within a Wi-Fi range proximity of the wireless location device 42, and absolute location of the wireless location device 42 based on interpreting a Wi-Fi mapping). The user device 12 further interprets the user input to produce the status associated with the user, and produces the status information to include the status associated with the user and the relative location of the wireless location device 42.

Alternatively, or in addition to, the user device 12 may utilize wireless location signals 32 from a plurality of wireless location devices 42 and user devices 14 to produce the status information. For example, the user device 12 receives a wireless communication signal 34 from a first user device 14, receives a wireless communication signal 34 from a second user device 14, receives another wireless communication signal 34 from a third user device 14, and estimates an absolute location of the user device 12 based on the received signals (e.g., triangulate).

The third primary function includes the computing system 10 identifying the communication path to synchronize the status information. In an example of operation of the identifying the communication path, the user device 12 identifies the communication path for communication of the status information (e.g., including the location synchronization information) to each of one or more synchronization entities (i.e., to one or more subscriber devices and/or user devices 14 either directly or via one or more intermediate communication nodes). Examples of the communication path include direct from the user device 12 to a wireless access device 30, and indirect via one or more user devices 14 and/or one or more other user devices 12 (e.g., a temporary mesh network).

The identifying of the communication path includes or more of identifying the synchronization entities (i.e., via a list, interpreting a query response), identifying other user devices 12 to aggregate location synchronization information, interpreting a communication path test result, and interpreting path history (e.g., a last utilized communication path). The identifying of the communication path further includes identifying preferred intermediate communication nodes (e.g., a series of user devices 12) and estimating required costs (e.g., wireless network 16) and/or power requirements for each of one or more identified paths (e.g., potential battery remaining energy level degradation for the user device 12, other user devices 12, and one or more user devices 14).

The identifying of the communication path further includes determining a communication path status (i.e. active/inactive) and generating a ranking of the one or more identified communication paths based on requirements of the communications path (e.g., select a highest ranked communications path with regards to matching requirements). For example, the user device 12 identifies another user device 12 with a higher level of remaining stored battery energy to serve as an intermediate node, and identifies a user device 14 within wireless communication signals range of the other user device 12. The user device 14 is favorably operably coupled via wireless communication signals 34 to a wireless access device 30. The wireless access device 30 is actively operably coupled to the control server 18 and to a subscriber device 22 via the network 24.

As another example, the user device 12 identifies another user device 14 within wireless communication signals range of the user device 12. The user device 14 indicates that user device 14 is identified to aggregate status information from device 12 and at least one other user device 12 for communication of the aggregated status information via wireless communication signals 34 to the wireless access device 30 etc.

The fourth primary function includes the computing system 10 communicating the status information. In an example of operation of the communicating the status information, the user device 12 facilitates, for each synchronization entity, communication of the location synchronization information utilizing an identified associated communication path in accordance with the location synchronization approach. The facilitating includes one or more of generating an application message 36 for encoding utilizing wireless communication signals 34, where the application message 36 includes one or more of an identifier of the user device 12, location coordinates, a location address, a geographic location identifier, an identifier of a wireless location device, and an identifier of an associated user device 14.

The facilitating further includes transmitting the wireless communication signals 34 in accordance with the associated communication path synchronization entity (e.g., to the user device 14, forwarding to the wireless access device 30, forwards to the subscriber device 22, and replicating the application message to send the replicated application message to the control server 18). Having received of the status information including the location securitization information, the subscribed device 22 displays the status information. Alternatively, or in addition to, when receiving the application message 36, the processing module 44 stores the status information with a timestamp as application information 38 in the database 20.

Alternatively, or in addition to, the subscriber device 22 facilitates storing of application information including one or more of the user account information, the user device recommendations, and the user device configuration in the database 20. For example, the subscriber device 22 identifies a particular user device 12 for association with the subscriber device 22, establishes privacy requirements (e.g., restrictions on communicating status information), and identifies a plurality of user devices 14 associated with trusted watchers (e.g., users of the user devices 14 with an affiliation with the particular user device 12, i.e., family members of a child associated with the user device 12).

The subscriber device 22 further identifies a desired number of days of battery life between recharging (i.e., power requirements), a daily schedule (i.e., a school schedule and after school schedule associated with the child), and an indication to synchronize the status information upon exceptions to the school and afterschool schedules as the location synchronization approach. Having updated the database 20, the processing module 44 transmits a portion of the updated database 20 to the user device 12 to facilitate operation of the user device 12 utilizing one or more elements of the application information.

Figure 2:
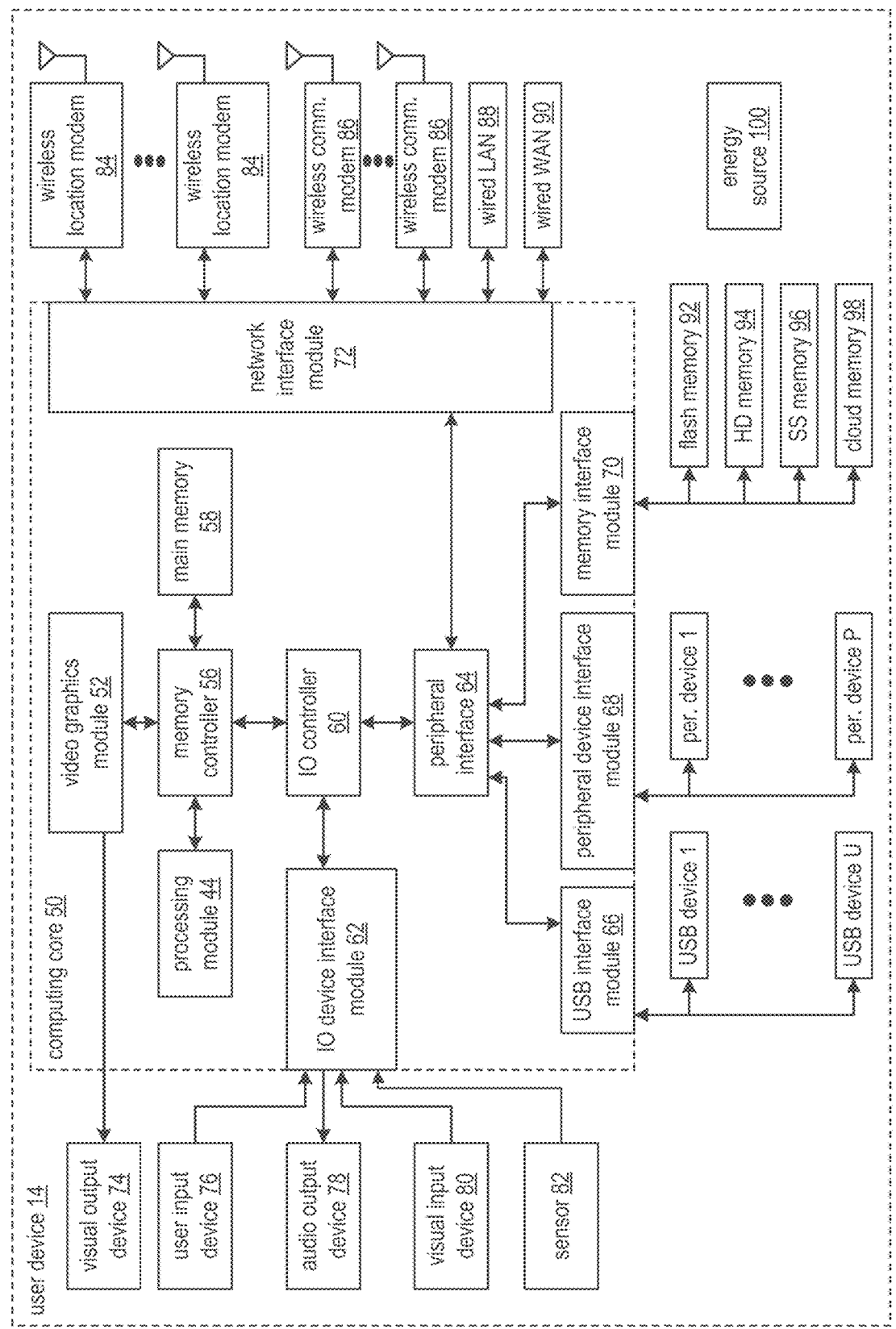
FIG. 2 is a schematic block diagram of an embodiment of user device of a computing system in accordance with the present invention.

FIG. 2 is a schematic block diagram of an embodiment of the user device 14 of the computing system 10 that includes a computing core 50, a visual output device 74 (e.g., a display screen, a light-emitting diode), a user input device 76 (e.g., keypad, keyboard, touchscreen, voice to text, etc.), an audio output device 78 (e.g., a speaker, a transducer, a motor), a visual input device 80 (e.g., a photocell, a camera), a sensor 82 (e.g., an accelerometer, a velocity detector, electronic compass, a motion detector, electronic gyroscope, a temperature device, and a pressure device. The user device 14 further includes an altitude device, a humidity detector, a moisture detector, an image recognition detector, a biometric reader, an infrared detector, a radar detector, an ultrasonic detector, a proximity detector, a magnetic field detector, a biological material detector, a radiation detector, a mass and/or weight detector, a density detector, a chemical detector, and a fluid flow volume detector.

The user device 14 further includes a DNA detector, a wind speed detector, a wind direction detector, a motion recognition detector, and a battery level detector, one or more universal serial bus (USB) devices 1-U, one or more peripheral devices, one or more memory devices (e.g., a flash memory device 92, one or more hard drive memories 94, one or more solid state (SS) memory devices 96, and/or cloud memory 98), an energy source 100 (e.g., a battery, a generator, a solar cell, and a fuel cell), one or more wireless location modems 84 (e.g., a GPS receiver, a Wi-Fi transceiver, a Bluetooth transceiver, etc.), one or more wireless communication modems 86 (e.g., 4G cellular), a wired local area network (LAN) 88, and a wired wide area network (WAN) 90

The computing core 50 includes a video graphics module 52, one or more processing modules 44, a memory controller 56, one or more main memories 58 (e.g., RAM), one or more input/output (I/O) device interface modules 62, an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that is executed by the processing module 44 and/or a processing circuit within the interface module. Each of the interface modules couples to one or more components of the user device 14. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

The main memory 58 and the one or more memory devices include a computer readable storage medium that stores operational instructions that are executed by one or more processing modules 44 of one or more computing devices (e.g., the user device 14) causing the one or more computing devices to perform functions of the computing system 10. For example, the processing module 44 retrieves the stored operational instructions from the HD memory 94 for execution.

Figure 3:
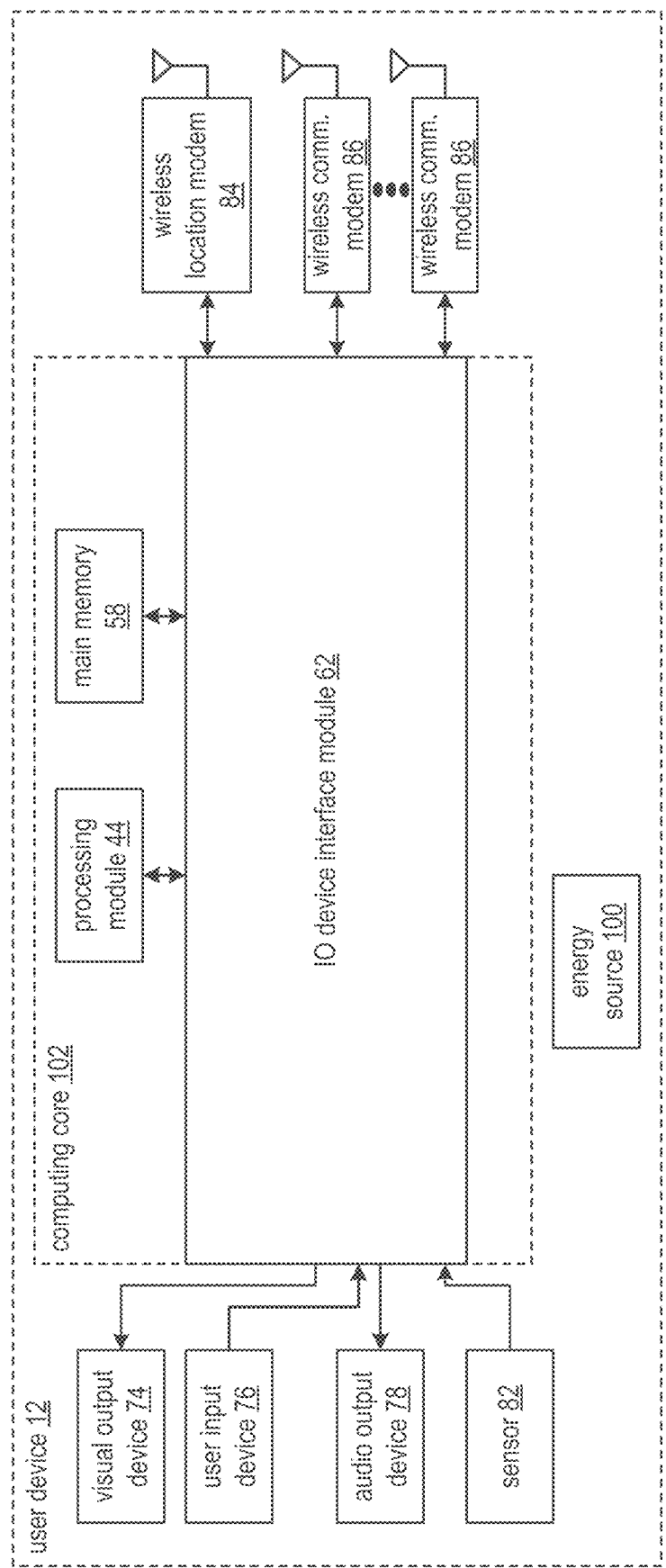
FIG. 3 is a schematic block diagram of another embodiment of user device of a computing system in accordance with the present invention.

FIG. 3 is a schematic block diagram of another embodiment of the user device 12 of the computing system 10 that includes a computing core 102, and elements of the user device 14 (e.g., FIG. 2), including one or more of the visual output device 74, the user input device 76, the audio output device 78, the sensor 82, the energy source 100, the wireless location modems 84, and the plurality of wireless communication modems 86. The computing core 102 includes the I/O device interface module 62 of FIG. 2, the main memory 58 of FIG. 2, and the processing module 44 of FIG. 2.

The user device 12 may be constructed to provide functionality to determine and communicate the status information in a cost-effective and low-power way. For example, the visual output device 74 is implemented to include a multi-color LED, the user input device 76 includes a switch, the audio output device 78 includes APs electric speaker, the sensor 82 includes a motion sensor and a battery level detector, the energy source 100 includes small form factor rechargeable batteries, the wireless location modem 84 includes a low-power GPS receiver, a first wireless communication modem 86 includes a Wi-Fi transceiver, and a second wireless communication modem 86 includes a Bluetooth transceiver.

Figure 4:
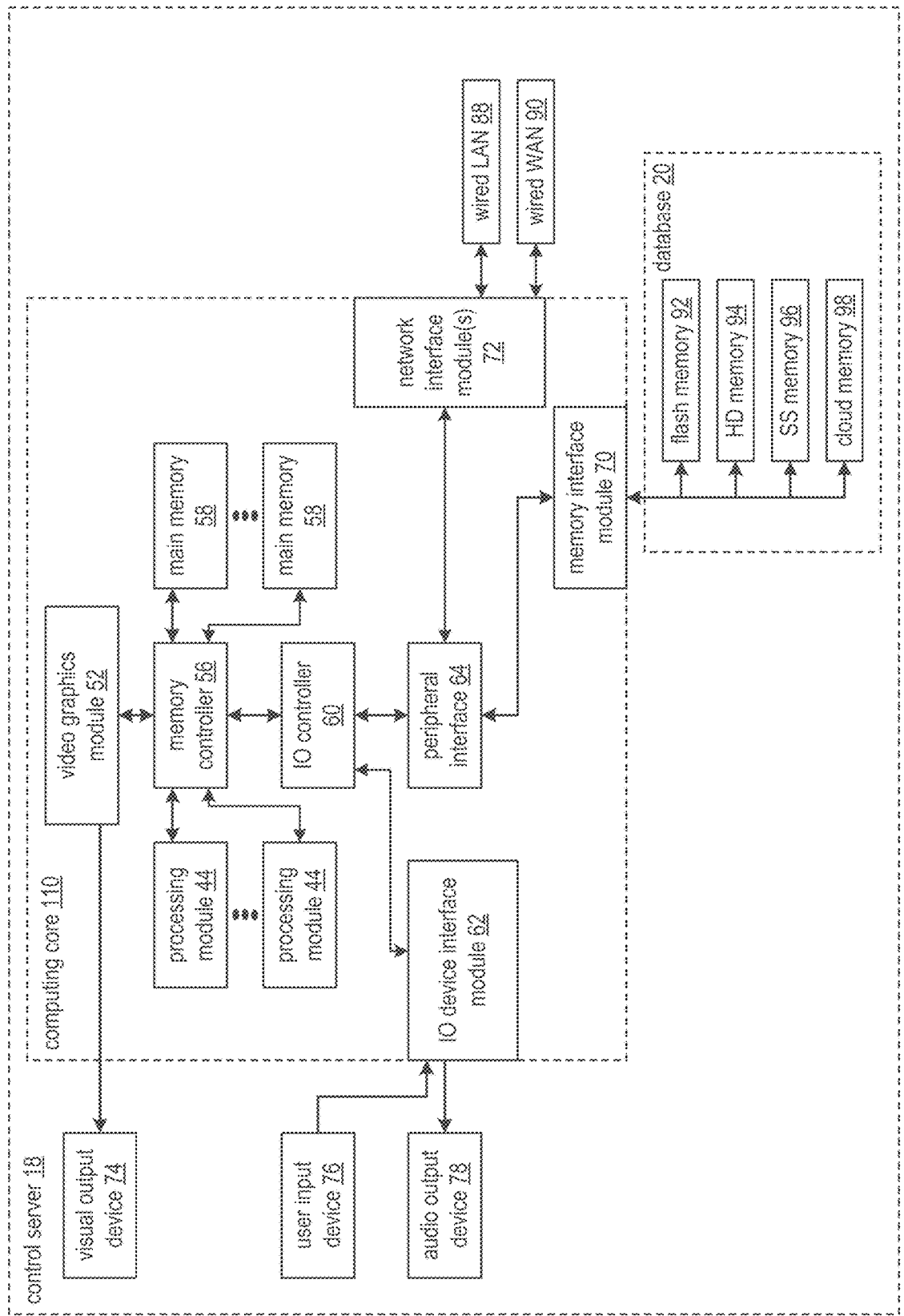
FIG. 4 is a schematic block diagram of an embodiment of a control server of a computing system in accordance with the present invention.

FIG. 4 is a schematic block diagram of an embodiment of the control server 18 of the computing system 10 that includes a computing core 110 and elements of the user device 14 (e.g., FIG. 2), including one or more of the visual output device 74, the user input device 76, the audio output device 78, the memories 92-98 to provide the database 20 of FIG. 1, the wired LAN 88, and the wired WAN 90. The computing core 110 includes elements of the computing core 50 of FIG. 2, including the video graphics module 52, the plurality of processing modules 44, the memory controller 56, the plurality of main memories 58, the input-output controller 60, the input-output device interface module 62, the peripheral interface 64, the memory interface module 70, and the network interface modules 72.

Figure 5:
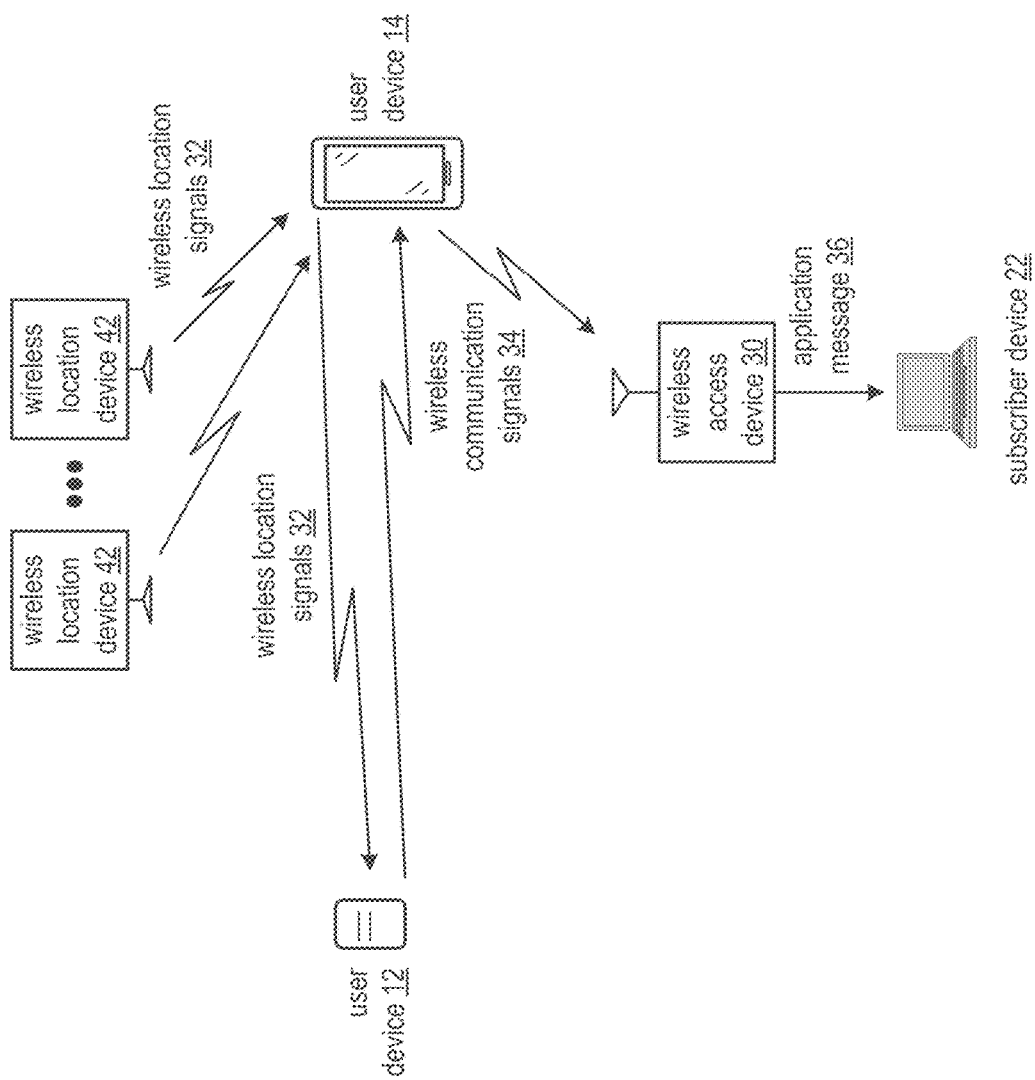
FIG. 5 is a schematic block diagram of another embodiment of a computing system in accordance with the present invention.

FIG. 5 is a schematic block diagram of another embodiment of a computing system that includes a plurality of wireless location devices 42 of FIG. 1, the user device 12 of FIG. 1, the user device 14 of FIG. 1, the wireless access device 30 of FIG. 1, and the subscriber device 22 of FIG. 1. The computing system functions to synchronize location status information, associated with the user device 12, to the subscriber device 22.

In an example of operation of the synchronization, the user device 12 obtains a location synchronization approach (e.g., under what circumstances to report location and status). The obtaining includes one or more of utilizing a predetermination (e.g., a default configuration), utilizing guidance from the subscriber device 22 (e.g., in accordance with a message from one or more of the control server 18 and the subscriber device 22), and determining the approach based on a current location (e.g., update more often when not at home or school).

The obtaining further includes determining the approach based on detecting other affiliated user devices 12 and/or one or more affiliated user devices 14 and determining the approach based on a current status of a user associated with the user device 12 (e.g., normal status, needs help, etc.). For example, the user device 12 determines to synchronize location and status every 10 minutes when there are no detectable affiliated user devices 12 and determines to synchronize the location and status every hour when at least one other affiliated user device 12 is detected (e.g., another family member is nearby).

Having obtained the location synchronization approach, the user device 12 obtains a location determination approach based on availability of location assets (e.g., available location determination assistance from one or more user devices 14, from one or more other user devices 12, and whether a GPS wireless location device 42 is detectable) and based on the location synchronization approach. The obtaining includes one or more of determining the applicability of a particular location determination approach with regards to the location synchronization approach (e.g., a required frequency of providing location updates may be too often to accommodate a particular location determination approach associated with a lengthy process to produce a location) and establishing wireless connectivity with the location assets (e.g., receiving wireless location signals 32.

The obtaining further includes receiving wireless communication signals 34), determining whether a particular location asset is able to provide assistance in determining the location, obtaining location requirements (e.g., from configuration information, from the subscriber device 22), where the requirements include one or more of absolute versus relative, location accuracy, power requirements for the location determination, and a priority level. The obtaining further includes utilizing the predetermination, and selecting an approach from two or more identified approaches that produces the location most favorably in accordance with the requirements. For example, the user device 12 determines to utilize a GPS location of the user device 14 to lower energy consumption of the user device 12 when the location determination requirements include minimize energy consumption guidance and allow utilization of a location proxy of a nearby location asset.

Having produced the location determination approach, the user device 12 facilitates generating the location synchronization information utilizing the location determination approach. For example, the user device 12 receives wireless location signals 32 from the user device 14, where the wireless location signals 32 includes a Bluetooth beacon identifying the user device 14 and GPS coordinates associated with the user device 14, where the user device 14 receives wireless location signals 32 from a plurality of wireless location devices 42 (e.g., GPS satellite constellation) to produce the GPS coordinates. The generating of the location synchronization information may further include the user device 12 reading a user input device (e.g., a push button switch, a motion detector) associated with the user device 12 to capture a current status associated with a user of the user device 12. When utilizing the current status, the user device 12 aggregates the location information and the current status reduce the location synchronization information.

Having generated the location synchronization information, the user device 12 identifies a communication path for communication of the location synchronization information to each of one or more synchronization entities (e.g., to the subscriber device 22 in accordance with configuration information). The identifying includes one or more of identifying the synchronization entities (e.g., from a list, based on one or more requests, in accordance with the configuration information), identifying location synchronization from at least one other user device 12 for aggregation (e.g., to save energy), and interpreting a communication path test result (e.g., extracting latency, i.e., accrued time to deliver at least part of a message).

The identifying further includes identifying energy requirements, error rates, etc., interpreting communication path history (e.g., which path was favorably utilized most recently), identifying preferred intermediate communication nodes for potentially relaying the location synchronization information (e.g., detecting one or more user devices 14, detecting a wireless access device 30, detecting one or more user devices 12, detecting a virtual mesh network), and estimating costs (e.g., network charges). The identifying further includes estimating energy requirements, determining a communication path status (e.g., active/inactive), and obtaining communication path requirements (e.g., from the configuration information, based on available energy levels of one or more user devices, based on the location synchronization approach. The identifying further includes generating a ranking of two or more communication paths measuring favorability of communication path attributes to the communication path requirements and selecting a highest ranked communication path or a first communication attempt (e.g., potential utilizing next ranked communication paths upon failure of a current communication attempt).

As an example of the identifying of the communication path, the user device 12 selects a communication path that includes transmitting a wireless communication signal 34 from the user device 12 to the user device 14. The user device 14 forwards an updated wireless communication signal 34 to the wireless access device 30 for communication of an application message 36 (e.g., that includes the location synchronization information) to the subscriber device 22. Alternatively, the user device 12 identifies a next ranked communication path that includes sending wireless communication signals 34 directly from the user device 12 to the wireless access device 30 (e.g., although with a higher level of energy consumption).

Having produced the location synchronization information and having identified the communication path, for each synchronization entity (e.g., the subscriber device 22), the user device 12 facilitates communication of the location synchronization information to the synchronization entity using an identified associated communication path in accordance with the location synchronization approach (e.g., timed appropriately). For example, the user device 12 generates communication path instructions (e.g., details of the communication path), encodes the location synchronization information and the communication path instructions to produce wireless communication signals 34 (e.g., status, GPS accordance of the user device 14, an indicator that the location of the user device 14 is a proxy for the location of the user device 12, an identifier the user device 12, identifiers of intermediate nodes of the communication path), and transmits the wireless communication signals 34 to the user device 14 in accordance with the identified communication path.

The user device 14 decodes the wireless communication signals 34 to reproduce the location synchronization information and updates the location synchronization information (e.g., adds an identifier of the user device 14, updates the encapsulated GPS location of the user device 14, aggregates other location synchronization from other user devices 12 and/or user devices 14) and encodes the updated location synchronization information to produce further wireless communication signals 34 for transmission to the wireless access device 30. When receiving the wireless communication signals 34, the wireless access device 30 decodes the application message 36 that includes the updated location synchronization information and sends the updated location synchronization information to the subscriber device 22 for further processing and/or display.

Alternatively, or in addition to, the user device 12 identifies a particular communication path to include a branch, where the location synchronization information follows the path for a first portion and then is split into two different branches to communicate replicated location synchronization information to two or more synchronization entities. For example, the user device 12 encodes the location synchronization information and communication path instructions to produce the wireless communication signals 34, sends the wireless communication signals 34 to the user device 14.

The user device 14 sends the further wireless communication signals 34 that includes the updated location synchronization information to the wireless access device 30. The wireless access device 30 interprets communication path instructions to replicate the updated location synchronization information and where the wireless access device 30 sends the updated location synchronization information to the subscriber device 22 and sends the replicated updated location synchronization information to the control server 18 for further processing and/or storage.

Figure 6:
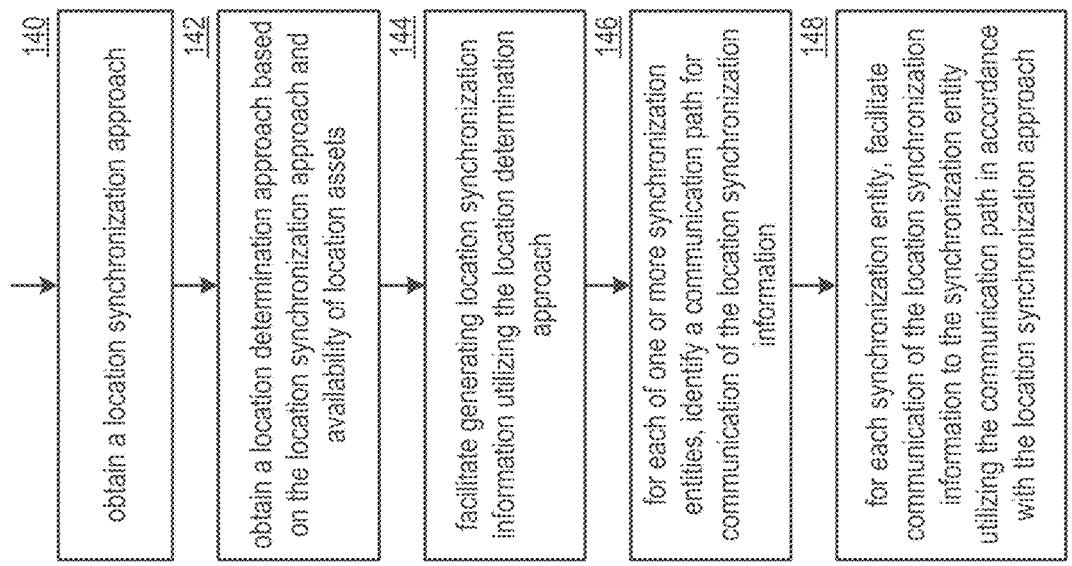
FIG. 6 is a logic diagram of an embodiment of a method of synchronizing locations status information in a computing system in accordance with the present invention.

FIG. 6 is a logic diagram of an embodiment of a method of synchronizing location status information in a computing system. The method includes step 140 where a processing module (e.g., of a first user device) obtains a location synchronization approach. The obtaining includes one or more of interpreting a predetermination, interpreting guidance from an associated subscriber device, basing the approach on a current location, and basing approach on a current status of a user of the user device.

The method continues at step 142 where the processing module obtains a location determination approach based on the location synchronization approach and availability of location assets. The determining may further be based on one or more of identification of requirements of the location determination approach, a predetermination, and interpretation of guidance from the subscriber device, and selecting of an approach that produces location information most favorably in accordance with the requirements of the location determination approach. The method continues at step 144 with a processing module facilitates generating location synchronization information utilizing the location determination approach.

For each of one or more synchronization entities, the method continues at step 146 where the processing module identifies a communication path for communication of the location synchronization information to the synchronization entity. The identifying includes one or more of identifying the synchronization entities (e.g., from a list), identifying other user devices to aggregate location synchronization information, interpreting a communication path test result, interpreting communication path history, identifying preferred intermediate communication nodes, estimating required costs, estimating energy consumption levels for each communication path, determining a communication path status level, generating a ranking of the one or more communication paths based on the requirements of the communication path, and selecting a highest ranked communication path.

For each synchronization entity, the method continues at step 148 where the processing module facilitates communication of the location synchronization information to the synchronization entity utilizing the communication path in accordance with the location synchronization approach. The facilitating includes generating an application message for encoding utilizing wireless communication signals, where the application message includes one or more of an identifier of the user device, location coordinates, a location address, a geographic location identifier, an identifier of a wireless communication device, communication path instructions (e.g., routing instructions), and an identifier of another user device.

The facilitating further includes transmitting the wireless communication signals in accordance with the associated communication path to the synchronization entity via a first intermediate node of the communication path instructions. Alternatively, or in addition to, the processing module retransmits the wireless communication signals via a next ranked communication path when a favorable confirmation message is not received within a confirmation time frame.

Figure 7A:
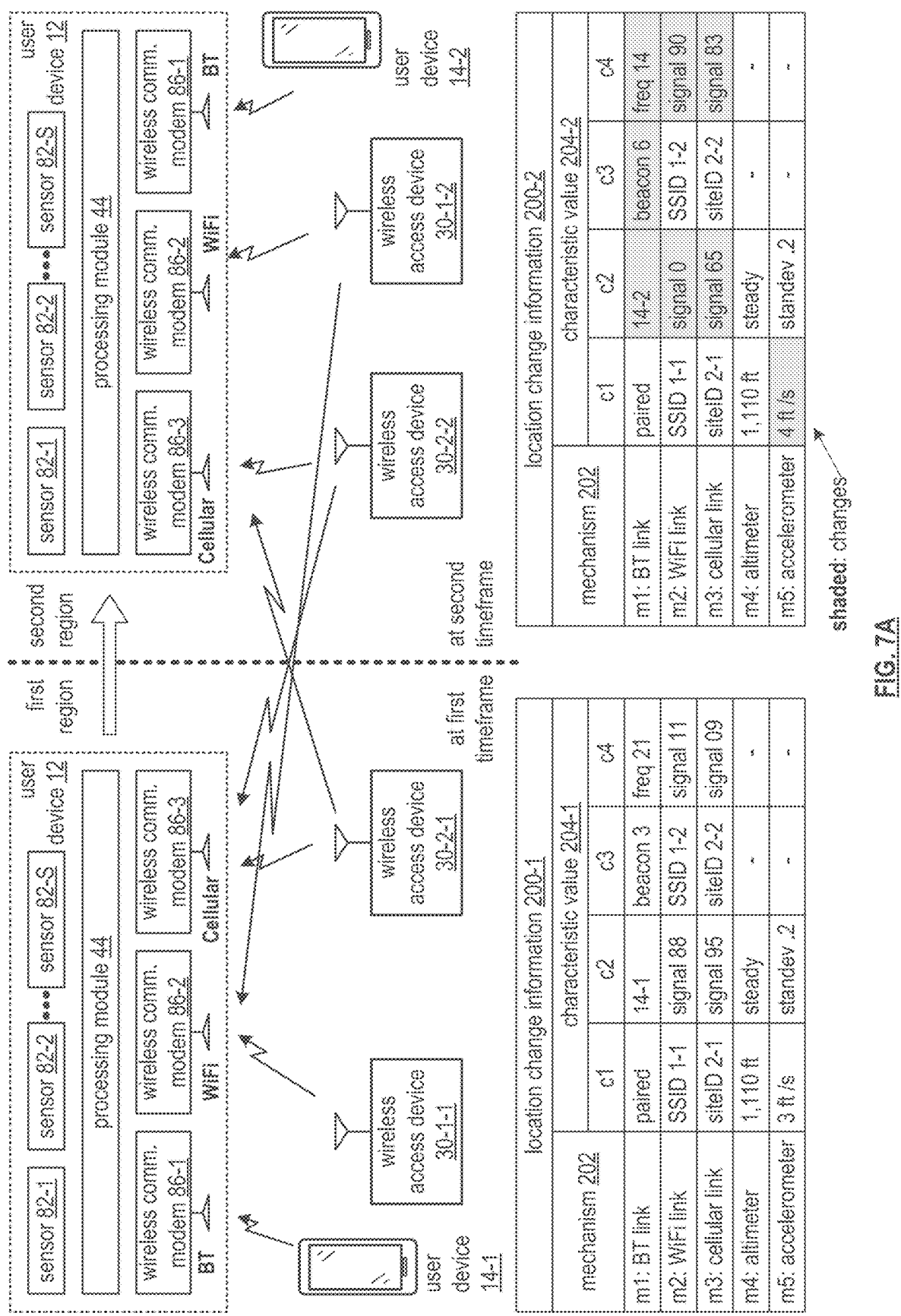
FIG. 7A is a schematic block diagram of another embodiment of a computing system in accordance with the present invention.

FIG. 7A is a schematic block diagram of another embodiment of a computing system that includes the user device 12 of FIG. 1, user devices 14-1 and 14-2, and an assortment of wireless access devices 30-1-1 and 30-1-2 along with 30-2-1 and 30-2-2. These are device 12 includes sensors 82-1 through 82-S, the processing module 44 of FIG. 3, and an assortment of wireless communication modems 86-1 through 86-3. The sensors 82-1 through 82-S may be implemented utilizing the sensor 82 of FIG. 3. The wireless communication modems 86-1 through 86-3 may be implemented utilizing the wireless communication modem 86 of FIG. 3, i.e., wireless communication modem 86-1 implemented with Bluetooth technology, wireless communication modem 86-2 implemented with Wi-Fi technology, and wireless communication modem 86-3 implemented with cellular technology. The user devices 14-1 and 14-2 may be implemented utilizing the user device 14 of FIG. 1. The assortment of wireless access devices may be implemented utilizing the wireless access device 30 of FIG. 1.

Generally, an embodiment of this invention presents solutions where the computing system 10 supports detecting a region change of the user device 12. For example, in a first time frame the user device 12 is associated with a first region (e.g., a geographic region or other) and in a second time frame, the user device 12 is associated with a second region. The region includes a portion of geography associated with one or more of a hemisphere, a continent, a country, a state, a county, a city, a neighborhood, a property, a building, a room, etc. The region may further include a proximity within a static or dynamically located object. For example, a region may include a 20 foot diameter around a vehicle that is moving from one city to the next.

The detecting of the region change of the user device 12 is based on obtaining and analyzing location change information. For example, differences between location change information 200-1 associated with the first region at the first time frame and location change information 200-2 associated with the second region at the second time frame drives decision-making to indicate region affiliation of the user device 12.

The location change information includes one or more characteristic values of one or more location mechanisms. The location mechanisms that includes one or more of a wireless communication link, an altimeter sensor output, an accelerometer sensor output, a barometer sensor output, a temperature sensor output, an image sensor output, a global positioning satellite (GPS) location modem output, and a user interface output (e.g., to capture a user input). The one or more characteristic values includes a sensor output value, a wireless device pairing status, a wireless link connectivity status, a paired wireless device identifier (ID), a wireless signal level, a wireless link error rate and wireless site ID, a wireless frequency, a wireless link beacon ID, a GPS location, an associated geographic region ID, and a status of the user device 12. (e.g., emergency alarm coded to a location).

In an example of operation of the detecting of the region change, the processing module 44 receives outputs from the sensors 82-1 through 82-S and monitors operational aspects of the assortment of wireless communication modems 86-1 through 86-3 to produce the location change information 200-1. The location change information 200-1 includes mechanisms 202 (e.g., Bluetooth link, Wi-Fi link, cellular link, altimeter sensor output, accelerometer sensor output) and characteristic values 204-1 (e.g., characteristics 1-4 or more). For instance, the processing module 44 indicates that the Bluetooth link is paired with user device 14-1 utilizing a beacon number three and a frequency number 21.

At the second time frame subsequent to the first time frame, the processing module 44 collects further output from the sensors 82-1 through 82-S and further monitors the operational aspects of the assortment of the wireless location modems 86-1 through 86-3 to produce the location change information 200-2. The location change information 200-2 includes the same mechanisms 202 but with different updated characteristic values 204-2. For instance, the processing module 44 indicates that the Bluetooth link is now paired with user device 14-2 utilizing a beacon number six and a frequency number 14.

Having selected the updated characteristic values of the mechanisms to produce the location change information 200-2, the processing module 44 compares characteristic values 204-2 to the characteristic values 204-1 to produce a comparison. For example, the processing module 44 discovers changes for the Bluetooth link that includes pairing with a different user device, utilizing a different beacon and utilizing a different frequency. As another example, the processing module 44 discovers changes for the Wi-Fi link where the wireless access device 30-1-1 of the first time frame is no longer visible in the second time frame but the wireless access device 30-1-2 is visible with a signal characteristic value of 90. As yet another example, the processing module 44 discovers changes for the cellular link where the signal level characteristic of the site ID 2-1 (e.g., wireless access device 30-2-1) has fallen from 95 in the first time frame to 65 in the second time frame and the signal level characteristic of the site ID 2-2 (e.g., wireless access device 30-2-2) has risen from 09 in the first time frame to 83 in the second time frame.

Having produced the comparison, the processing module 44 determines whether the user device 12 is still located within the first region during the second time frame based on the comparison and a comparison approach of a plurality of comparison approaches. The plurality of comparison approaches includes a weighted characteristic approach where weighting factors are assigned to each characteristic for multiplication by a characteristic difference value of the comparison to produce an interim value and adding up the interim values to produce a score for comparison to scoring thresholds. A high priority characteristic approach includes prioritizing a key characteristic such that a corresponding characteristic difference that is greater than a minimum threshold value independently causes indication of a region change.

In a first instance, the processing module 44 indicates egress from the first region to the second region when multiple Wi-Fi wireless access devices dropout that are associated with the first region and one or more Wi-Fi wireless access devices appear that are associated with the second region. In a second instance, the processing module 44 indicates the egress from the first region to the second region when signal levels associated with cellular communication sites of the first region are lower in the second time frame and signal levels associated with cellular communication sites of the second region are higher and the second time frame. In a third instance, the processing module 44 indicates egress from the first region to the second region when an altimeter sensor output indicates a rapid elevation increase of 20 feet, where the first and second regions are associated with two adjacent floors of a high-rise building.

FIG. 7B is a logic diagram of an embodiment of a method of detecting a user device geographic region change. In particular, a method is presented for use in conjunction with one or more functions and features described in conjunction with FIGS. 1-6, and also FIG. 7A. The method includes step 210 where a processing module of one or more processing modules of one or more computing devices of the computing system determines values of characteristics for each of a plurality of location mechanisms associated with a user device for a first time frame, where the user device is located within a first region. For example, the processing module gathers characteristic values from one or more sensors and from one or more wireless communication modems.

The method continues at step 212 where the processing module determines updated values of at least some of the characteristics for one or more of the location mechanisms for a second time frame that a subsequent to the first time frame. For example, the processing module initiates determining based on one or more of detection of the second time frame, a timer has expired, and detection of a refresh trigger (e.g., at least one new value of a characteristic that is greater than a change threshold level). For example, the processing module gathers new values from the one or more sensors and from the one or more wireless location modems.

The method continues at step 214 where the processing module compares one or more of the values of the characteristics for at least some location mechanisms of the first time frame to the corresponding one or more values of corresponding characteristics for a corresponding location mechanisms for the second time frame to produce a comparison. For example, the processing module calculates a difference between values of a similar characteristic of a similar mechanism.

The method continues at step 216 where the processing module determines whether the user devices located within the first region during the second time frame based on the comparison and a comparison approach. For example, the processing module indicates that the user device is not located within the first region when a score from the comparison utilizing the weighted comparison approach is unfavorable (e.g., many differences in characteristic values that point to a new region). Alternatively, or in addition to, the processing module indicates a new region when the characteristic values associated with a second time frame are favorably associated with a particular new region.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8A:
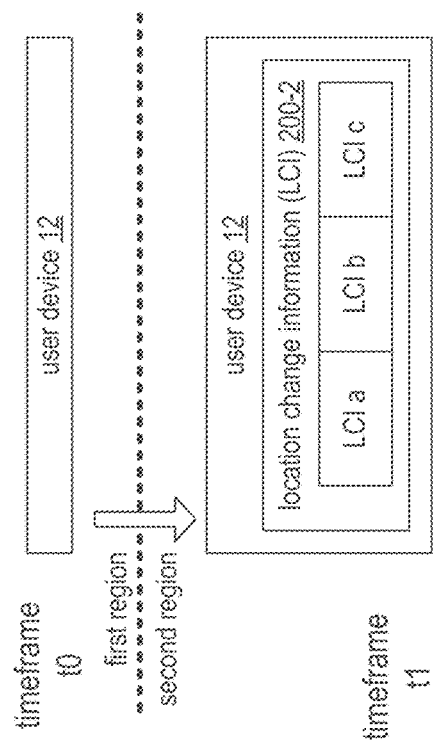
Figure 8B:
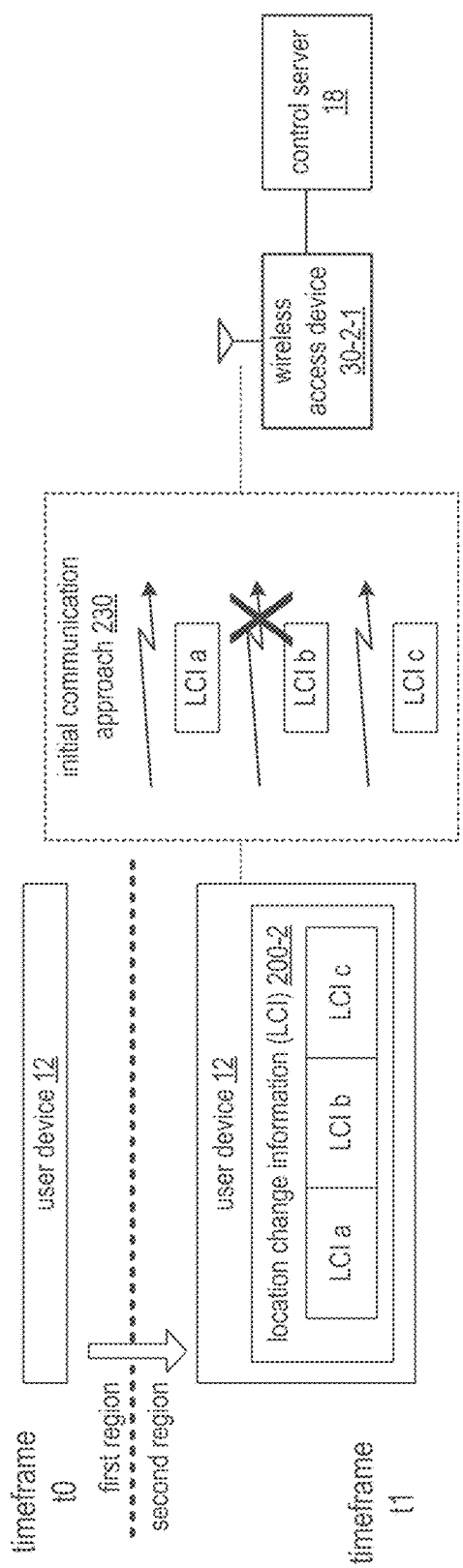

FIGS. 8A-C are schematic block diagrams of another embodiment of a computing system that includes the user device 12 of FIG. 1, a wireless access device 30-2-1, and the control server 18 of FIG. 1. The wireless access device 30-2-1 may be implemented utilizing the wireless access device 30 of FIG. 1. Generally, an embodiment of this invention presents solutions where the computing system 10 supports communicating location change information.

FIG. 8A illustrates a first step of an example of the communicating the location change information where the user device 12, having already obtained the location change information 200-1 of FIG. 7A for the first region at a time frame t0, obtains the location change information 200-2 for the second region at a time frame t1. Having obtained the location change information 200-2, the user device 12 determines to report at least a portion of the location change information 200-2 (e.g., to the control server 18). The location change information may include one or more portions associated with various characteristics and location mechanisms. For example, a portion (a) may pertain to wireless communication links, a portion (b) may pertain to sensors of the user device 12, and a portion (c) may pertain to an output of a user input device of the user device 12.

FIG. 8B illustrates a next step of the example of the communicating the location change information where the user device 12 sends, via the wireless access device 30-2-1, the location change information 200-2 to the control server 18 utilizing an initial communication approach 230. The initial communication approach 230 is in accordance with one or more objectives such as minimal delay, minimal complexity, minimal cost while compromising the integrity of complete message delivery. More particularly, the user device 12 selects the initial communication approach 230 with latency of delivery, data volume of the location change information, and unconfirmed delivery to favorably support the one or more objectives. Unconfirmed delivery includes a data delivery service using best effort to deliver a message but without certainty of delivery.

For instance, the user device 12 sends the three portions of the location change information in three different wireless messages via the wireless access device 30-2-1 utilizing a cellular unstructured supplementary data service (USSD). The USSD is known to provide fast data transfer utilizing small packets for a small amount of data that is sent on securely with unconfirmed delivery providing a simple means to transfer data at a relatively low cost. However, with all unconfirmed delivery mechanisms, failure of communicating even a portion of the message may result in not communicating the message. For example, the location change information may not be communicated to the control server 18 when a USSD message carrying the LCIb portion fails.

Subsequent to the sending the location change information, the user device assigns a priority level of the location change information. The user device 12 may determine the priority level or may utilize a default priority level based on a condition (e.g., status of the user device 12).

FIG. 8C illustrates a next step of the example of the communicating the location change information where, when the priority level of the location change information is greater than a priority threshold, the user device 12 selects a new communication approach 240 to retransmit the location change information 200-2 to the control server 18. The new communication approach 240 is in accordance with one or more new objectives such as complete message delivery while compromising message delay and complexity. More particularly, the user device 12 selects the new communication approach 240 with confirmed delivery and associated latency of delivery and data volume to favorably support the one or more new objectives.

For instance, the user device 12 selects the new communication approach 240 to include a cellular TLS (transport layer security) data service, where large amounts of data can be communicated securely with confirmed delivery albeit with a slower message delivery latency as compared to the initial communication approach 230. For example, the TLS data service includes a session start exchange 242 (e.g., to request a TLS session), a protocol exchange 244 (e.g., to communicate supported protocols), a security exchange 246 (e.g., to facilitate arriving at a common session key to encrypt data), sending of the payload (e.g., location change information 200-2 in its entirety over a cellular data resource), and wrapping up with a session and exchange 248 (e.g., to facilitate closing the session).

FIG. 8D is a logic diagram of an embodiment of a method of communicating location change information change within a computing system. In particular, a method is presented for use in conjunction with one or more functions and features described in conjunction with FIGS. 1-6, and also FIGS. 7A-C. The method includes step 260 where a processing module of one or more processing modules of one or more computing devices of the computing system determines to report location change information of a first computing device to a second computing device.

The determining to report the location change information of the first computing device to the second computing device includes a variety of reporting approaches. A first reporting approach includes generating the location change information to include an identifier of the first computing device and a first characteristic value of a plurality of characteristics values associated with a first location mechanism of a plurality of location mechanisms. For example, the processing module gathers wireless link status and computing device sensors status.

A second reporting approach includes detecting a possible geographic region change based on the location change information. For example, the processing module interprets changes in the location change information to detect the possible geographic region change.

A third reporting approach includes detecting a potential loss of communications. For example, the processing module identifies a downward trend in wireless communication link signal strength.

A fourth reporting approach includes detecting that a current location is different by more than a difference threshold from a previous location. For example, the processing module detects that the first computing device has moved 25 feet from the previous location and the difference threshold is 20 feet.

A fifth reporting approach includes detecting that a location reporting time frame has expired. For example, the processing module detects expiration of a timer associated with the location reporting time frame.

The method continues at step 262 where the processing module sends the location change information to the second computing device utilizing an initial communication approach. The initial communication approach includes at least one of first latency, first data volume, and unconfirmed delivery.

The sending the location change information to the second computing device utilizing the initial communication approach includes a series of steps. A first step includes obtaining an objective of the initial communication approach. The objectives includes minimizing message delivery delay, minimizing power utilization and allowing a compromise of message delivery. The obtaining of the objective includes one or more of retrieving a default objective, interpreting a request, and interpreting historical communication results to identify a satisfactory objective.

A second step of the sending the location change information includes selecting the initial communication approach from a plurality of communication approaches based on the objective of the initial communication approach and the location change information. The first latency, the first data volume, and the unconfirmed delivery favorably support the objective of the initial communication approach. For example, the processing module selects a cellular unstructured supplementary data service (USSD) with 1 repeat cycle and divides the location information into a plurality of messages when the location change information includes over 1,000 bytes but less than 10,000 bytes. As another example, the processing module selects a cellular user datagram protocol (UDP) data service when over 10,000 bytes and reliability of message delivery is not important.

A third step of the sending the location change information includes transmitting the location change information to the second computing device using the initial communication approach. For example, the processing module divides the location change information between sub-messages, utilizes unconfirmed and non-queued data delivery, and use repeats to improve probability of full information received, i.e., via USSD, not store-and-forward, not confirmed delivery.

Subsequent to the sending the location change information, the method continues at step 264 where the processing module assigns a priority level of the location change information based on one or more environmental parameters. The environmental parameters includes one or more of first computing device location, schedule adherence of the first computing device, estimated future location of the first computing device, communication loss eminent with the first computing device, and emergency status associated with the first computing device, and the second computing device did not receive all of the location change information.

The assigning the priority level of the location change information based on the one or more environmental parameters includes establishing the priority level of the location change information to be greater than the priority threshold when detecting at least one of a variety of conditions of the one or more environmental parameters. The conditions includes an unfavorable current location (e.g., a dangerous area), unfavorable schedule adherence (e.g., off route, behind schedule, ahead of schedule), and an unfavorable motion trajectory. An instance of the unfavorable motion trajectory includes an Alzheimer's patient walking out of a care facility and towards a lake in the middle of the night.

The conditions further includes a potential loss of communications (i.e., a high priority condition when the first computing device is moving away from reliable communications) and an unfavorable status of the first computing device (e.g., emergency alarm). The conditions still further includes an unfavorable response from the second computing device and an acknowledgment timeframe has expired with a receiving a response from the second computing device. The unfavorable response includes one or more of a request for more information, a resend request, and an instruction not to go to sleep (e.g., when unknowingly entering into a dangerous area etc.).

The method continues at step 266 where the processing module determines whether the priority level of the location change information is greater than a priority threshold. For example, the processing module retrieves the priority threshold or determines the priority threshold based on at least some of the location change information, i.e., a status of the first computing device, and compares the priority level of the location change information to the priority threshold to produce a comparison. The method branches to step 272 when the priority level of the location change information is not greater than the priority threshold. The method continues to step 268 when the priority level of the location change information is greater than the priority threshold.

When the priority level of the location change information is greater than a priority threshold, the method continues at step 268 where the processing module selects a new communication approach for retransmission of at least a portion of the location change information. The new communication approach includes at least one of second latency, second data volume, and confirmed delivery, wherein the first latency is less than the second latency, and the first data volume is less than the second data volume.

The selecting the new communication approach for retransmission of the at least a portion of the location change information includes one or more selection approaches. A first selection approach includes obtaining an objective of the new communication approach. The obtaining the objective includes one or more of retrieving a default, interpreting a request, and interpreting historical communication results.

A second selection approach includes selecting the new communication approach from a plurality of communication approaches based on the objective of the new communication approach and the location change information. The second latency, the second data volume, and the confirmed delivery favorably support the objective of the new communication approach. For example, the processing module selects a cellular data service with confirmed delivery and selects an IP protocol (e.g., TLS) to provide favorable security when the objectives include allowing a greater level of message latency and allowing a larger data payload for the seller data service.

A third selection approach includes identifying the at least a portion of the location change information based on incomplete delivery of the location change information utilizing the initial communication approach. For example, the processing module interprets an incomplete delivery indicator. As another example, the processing module estimates which portion based on an aspect of the initial communication approach.

The method continues at step 270 where the processing module resends the at least a portion of the location change information to the second computing device using the new communication approach. A desired percentage (e.g., >10%) of a plurality of location change information (e.g., sent over time) will have a priority level that is less than or equal to the priority threshold (e.g., allowable to always try unconfirmed delivery first), where the plurality of location change information includes the location change information.

The resending the at least a portion of the location change information to the second computing device using the new communication approach includes a series of steps. A first step includes transmitting the at least a portion of the location change information to the second computing device using the new communication approach. For example, the processing module resends utilizing a message queue telemetry transport (MQTT) protocol over the TLS session.

A second step of the resending includes, when the desired percentage of the plurality of location change information does not have the priority level that is less than or equal to the priority threshold, the processing module updating the priority threshold such that the desired percentage of the plurality of location change information will have the priority level that is less than or equal to the priority threshold. For instance, the processing module raises the threshold when too many communication attempts of sending the location change information have to advance to use of the new communication approach.

When the priority level of the location change information is less than the priority threshold, the method continues at step 272 where the processing module detects an unfavorable likelihood level of communicating the location change information to the second computing device utilizing the initial communication approach. The processing module detects the unfavorable likelihood level based on one or more of historical records, deducing no acknowledgment within an acknowledgment time frame, receiving an indication that a portion of the location change information was not received, determining a probability level of favorable communications, and comparing to a minimum probability threshold level.

As a specific example of detecting the unfavorable likelihood level, the processing module receives an indicator from the second computing device that one of three messages was not received. As another specific example of detecting an unfavorable likelihood level, the processing module identifies an unfavorable reliability trend from the historical records of utilizing the particular initial communication approach to the particular second computing device.

When detecting the unfavorable likelihood level of communicating the location change information to the second computing device, the method continues at step 274 where the processing module selects the new communication approach for retransmission of the at least a portion of the location change information. The method continues at step 276 where the processing module resends the at least a portion of the location change information to the second computing device using the new communication approach.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
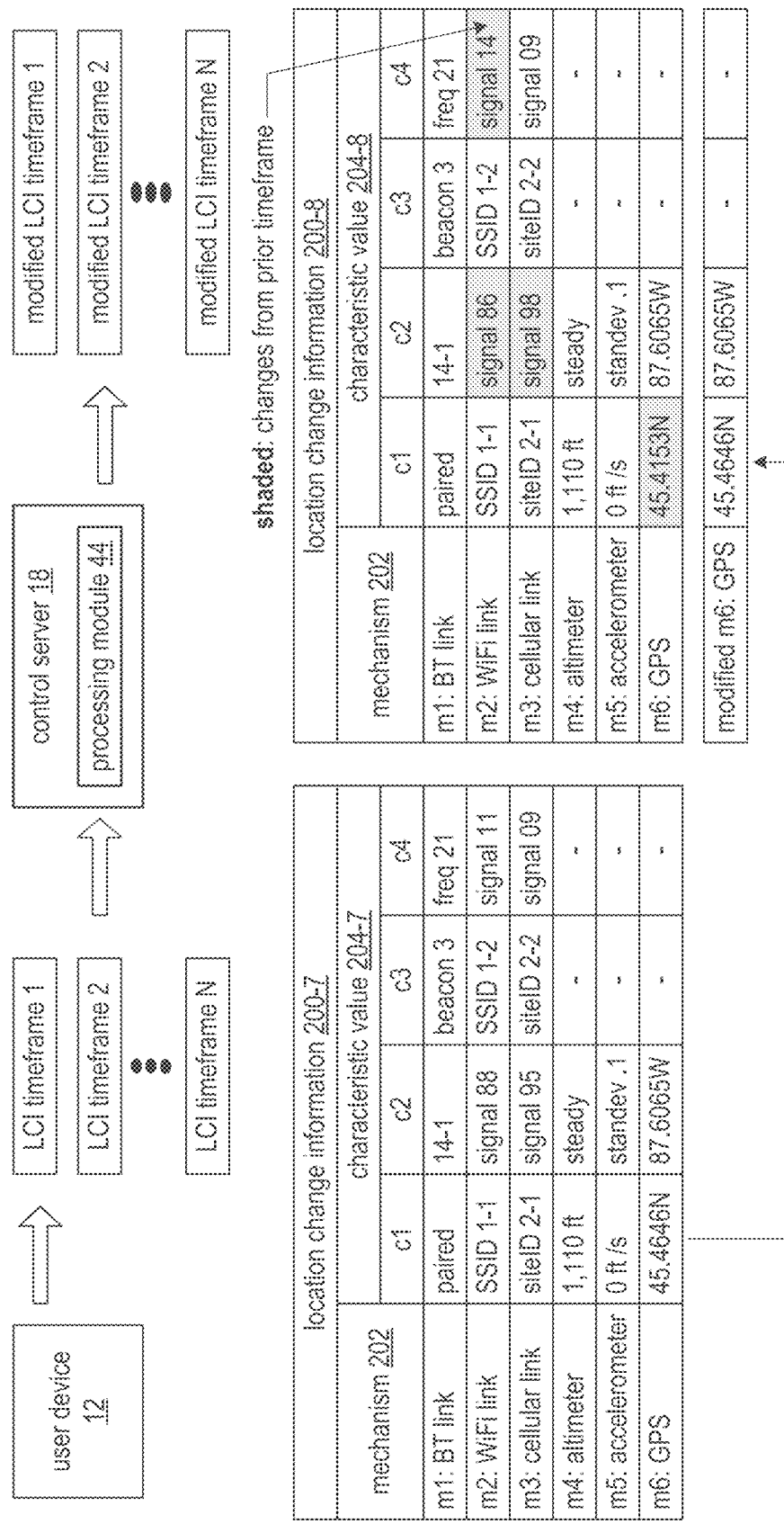
FIG. 9A is a schematic block diagram of another embodiment of a computing system in accordance with the present invention.

FIG. 9A is a schematic block diagram of another embodiment of a computing system that includes the user device 12 and the control server 18 of FIG. 1. The control server 18 includes the processing module 44 of FIG. 1. Generally, an embodiment of this invention presents solutions where the computing system 10 supports resolving conflicting location information from the user device 12.

In an example of operation to resolve the conflicting location information, the processing module 44 of the control server 18 receives a location change information for a plurality of time frames 1-N. For example, the processing module 44 receives location change location change information 200-7 and 200-8 for two of the time frames from the user device 12. The location change information has a format as previously discussed in greater detail with reference to FIG. 7A. For example, the location change information 200-7 includes characteristic values 204-7 for each the mechanisms 202 for the first of the two time frames and location change information 200-8 includes characteristic values 204-8 for each the mechanisms 202 for the second of the two time frames.

Having obtained the location change information for the plurality of time frames, the processing module 44 identifies at least one conflict between characteristic values for similar mechanisms between the at least two of the sets of location change information. For example, when identifying a false positive location change, the processing module 44 identifies one characteristic that has changed indicating motion but that conflicts with multiple other characteristics that did not change or did not change very much. For instance, the processing module 44 identifies a characteristic value change of a GPS receiver indicating that the user device 12 has moved several miles south but characteristics from Wi-Fi and cellular wireless communication modems are not consistent with the user device 12 moving several miles (e.g., same wireless site identifiers and similar signal strengths).

Having identified the conflict, the processing module 44 selects a resolution approach to resolve the conflict. The resolution approaches includes de-bouncing values of conflicting characteristics, performing a majority vote on a location indicator, and determining a location based on weighting each location mechanism. The selecting may be in accordance with which location mechanisms are conflicting. For example, since GPS receivers are known to glitch and report a movement when there really is no movement, the de-bouncing approach is selected. As another example, since it is known that wireless signals are subject to a phenomenon called fading, the weighting of the characteristic values associated with wireless signal strength is applied to resolve the conflict when the location mechanism of the conflict is a wireless signal strength.

Having selected the resolution approach, the processing module 44 applies the resolution approach to the conflicting location information to produce modified location change information for one or more of the time frames 1-N. For example, when utilizing the de-bouncing approach for the GPS characteristic values, the processing module 44 modifies the GPS characteristic values of the second time frame to be the same as the first time frame when a majority of the other characteristics of the other mechanisms indicate that the user device 12 has not moved (e.g., slight variance in wireless signal strengths that is less than a variance threshold).

Figure 9B:
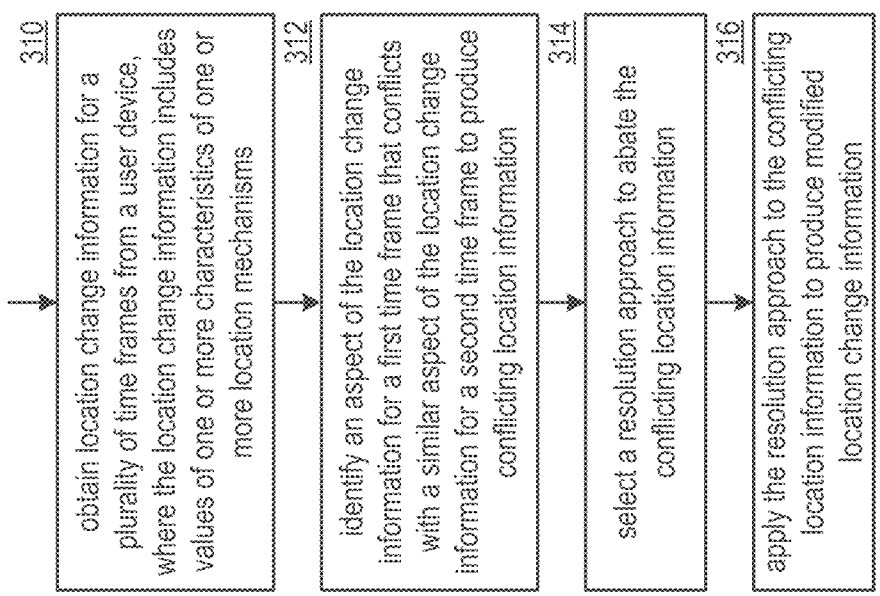
FIG. 9B is a logic diagram of an embodiment of a method of resolving conflicting location information in a computing system in accordance with the present invention.

FIG. 9B is a logic diagram of an embodiment of a method of resolving conflicting location information within a computing system. In particular, a method is presented for use in conjunction with one or more functions and features described in conjunction with FIGS. 1-6, and also FIG. 9A. The method includes step 310 where a processing module of one or more processing modules of one or more computing devices of the computing system obtains location change information for a plurality of time frames from a user device. The location change information includes values of one or more characteristics of one or more location mechanisms. The obtaining includes one or more of issuing a request, receiving a response, retrieving from the database, and gathering the location change information, i.e., locally by the user device.

The method continues at step 312 where the processing module identifies an aspect of the location change information for a first time frame that conflicts with a similar aspect of the location change information for a second time frame to produce conflicting location information. The identifying includes identifying two characteristic values for a common location mechanism that indicates the location change when characteristic values for another location mechanism does not indicate the location change. For example, detecting that GPS data indicates rapid movement but cellular sites and Wi-Fi access points have about the same signal strength for the same sites across the two time frames.

The method continues at step 314 where the processing module selects a resolution approach to abate the conflicting location information. The selecting may be based on one or more of which location mechanism is conflicting, historical correctness performance, and indications from other user devices associated with similar location information. For example, the processing module may request a portion of location change information associated with another user device that is known to be near the user device of the conflict.

The method continues at step 316 where the processing module applies the resolution approach to the conflicting location information to produce modified location change information. The applying includes modifying one or more values of the characteristics associated with the conflicting location information in accordance with the resolution approach. For example, the processing module modifies a GPS aspect to be consistent with another time frame when other characteristic values of other location mechanism suggest a similar location to abate the conflict.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 10A:
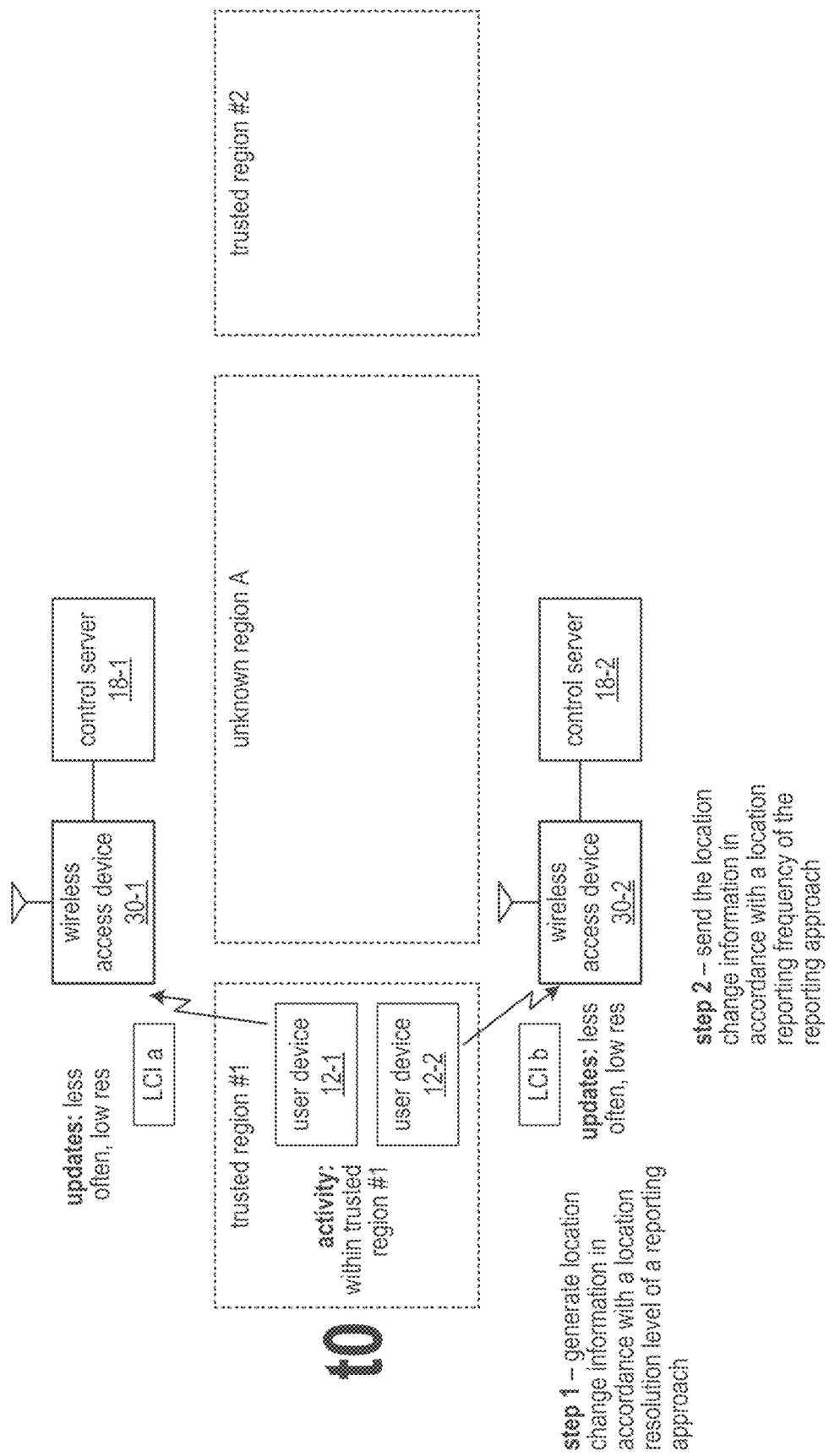
FIGS. 10A-10C are schematic block diagrams of another embodiment of a computing system illustrating an embodiment of a method for communicating location change information in accordance with a reporting approach within a computing system in accordance with the present invention.
Figure 10B:
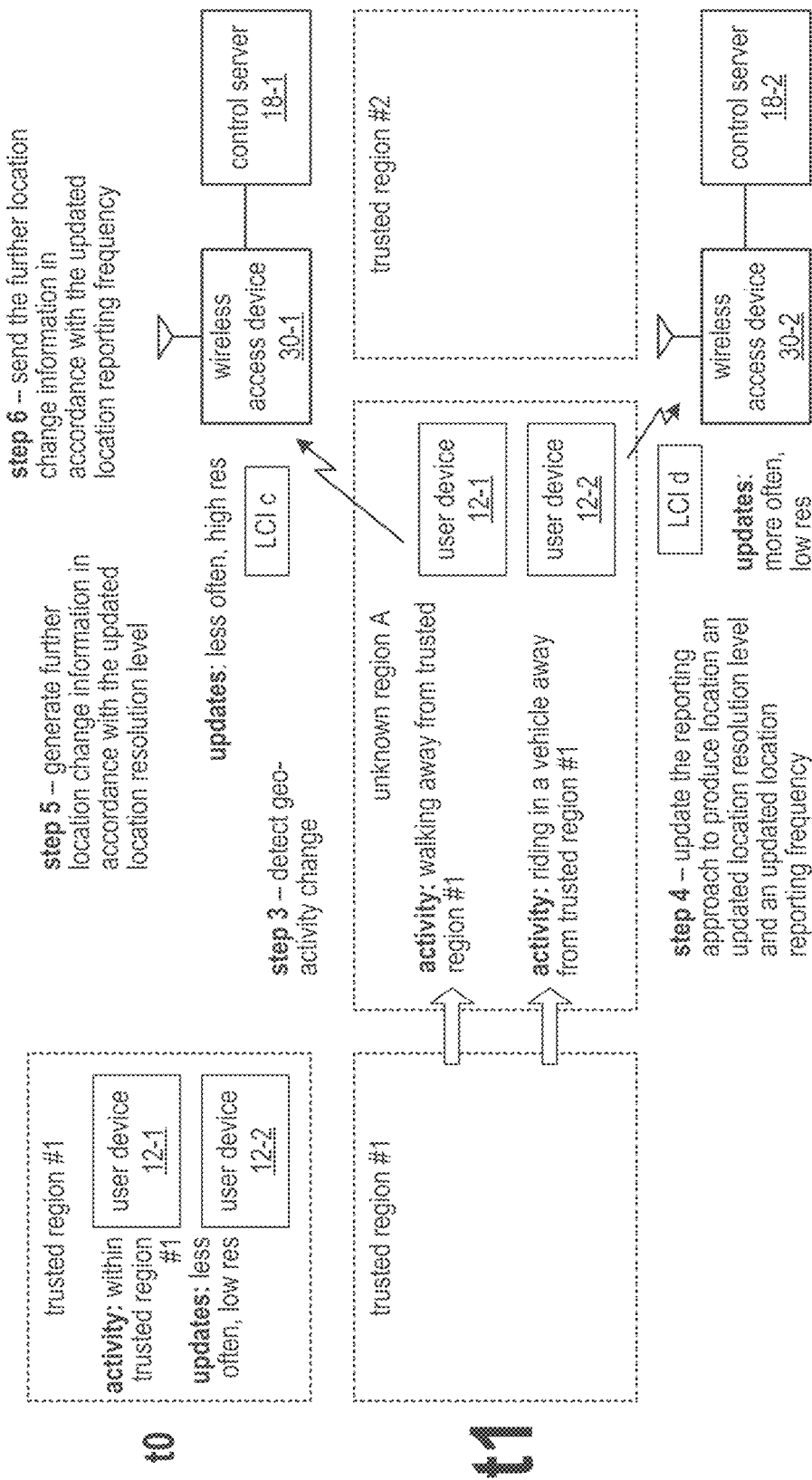
Figure 10C:
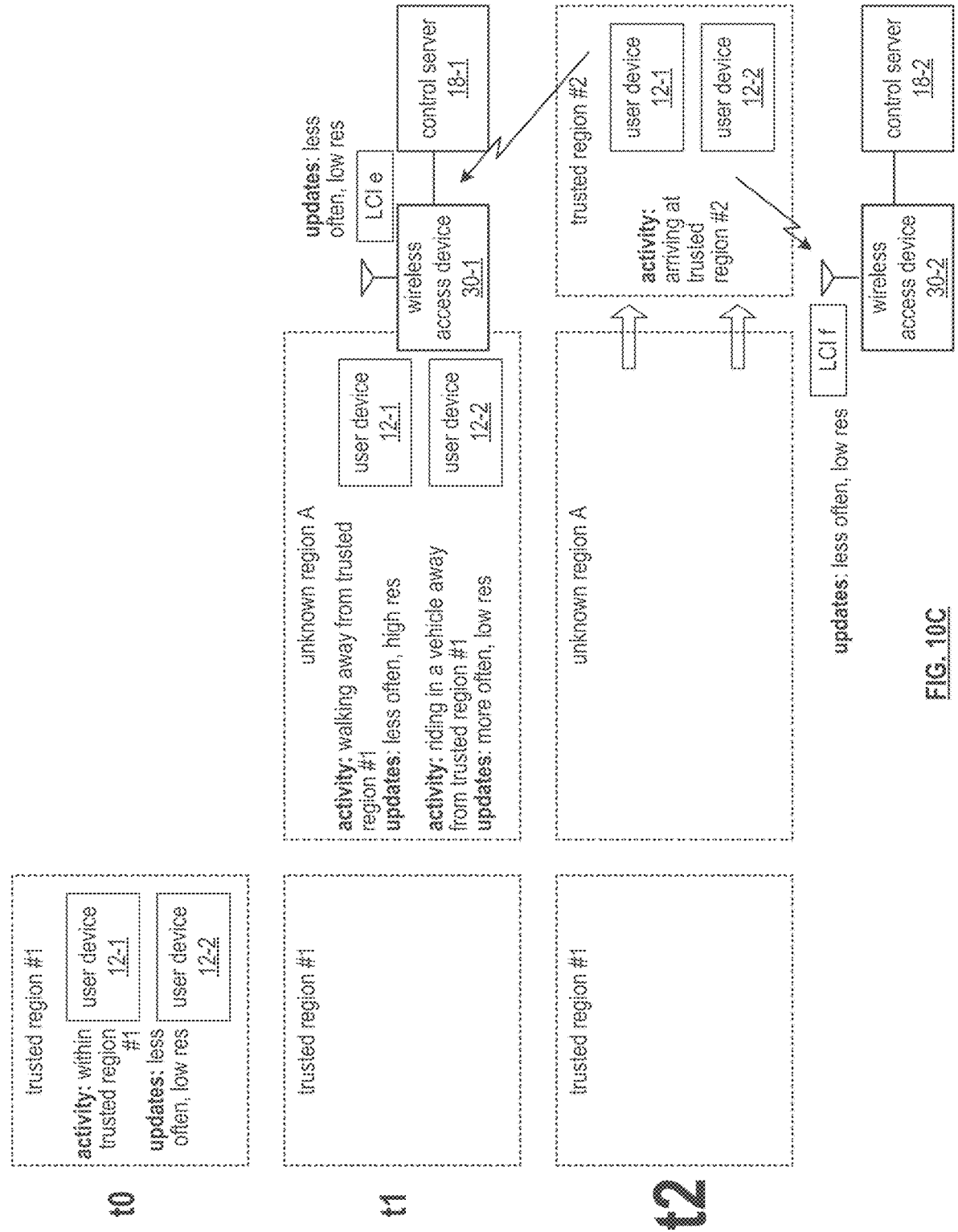

FIGS. 10A-10C are schematic block diagrams of another embodiment of a computing system illustrating an embodiment of a method for communicating location change information in accordance with a reporting approach within a computing system. The computing system includes user devices 12-1 and 12-2, wireless access devices 30-1 and 30-2, control servers 18-1 and 18-2, a first and second trusted regions and an unknown region A. The user devices 12-1 and 12-2 may be implemented utilizing the user devices 12 of FIG. 1 and are interchangeably referred to as a first computing device. The wireless access devices 30-1 and 30-2 may be implemented utilizing the wireless access devices 30 of FIG. 1. The control servers 18-1 and 18-2 may be implemented utilizing the control server 18 of FIG. 1 and are interchangeably referred to as a second computing device.

The first and second trusted regions represent geographic areas that are more favorable for association with the user devices 12-1 and 12-2. For example, trusted region #1 is associated with a first trusted watcher and the trusted region #2 is associated with a second trusted watcher. The unknown region A includes an area of unknown trust that is excluded from the trusted regions #1 and #2.

FIG. 10A illustrates an example of the method of the communicating location change information in accordance with the reporting approach at a time t0 where the first computing device generates location change information of the first computing device in accordance with a location resolution level of a reporting approach. For example, the user device 12-1 generates location change information LCIa in accordance with the location resolution level associated with the user device 12-1. As another example, the user device 12-2 generates location change information LCIb in accordance with the location resolution level associated with the user device 12-2.

The reporting approach includes the location resolution level and a location reporting frequency. The location resolution level indicates a degree of accuracy of a representation of the location change information (e.g., location within 1 inch for a high location resolution level, location within 1,000 feet for a low location resolution level). The location reporting frequency indicates how often location is to be reported (e.g., report every two seconds for a high location reporting frequency, report every 10 minutes for a low location reporting frequency).

The generating the location change information of the first computing device in accordance with the location resolution level of the reporting approach includes a series of steps. A first step includes selecting a first location mechanism of the first computing device based on the location resolution level. For example, the user device 12-1 selects a wireless communication link as the first location mechanism when the location resolution level for user device 12-1 is lower. In an instance, the location resolution level is established lower when the user device 12-1 is within trusted region #1. As another example of the first step, the user device 12-1 selects a global positioning satellite (GPS) location modem output as the first location mechanism when the location resolution level is higher. In another instance, the location resolution level is established higher when the user device 12-1 is outside of the trusted region #1.

A second step of the generating of the location change information includes obtaining a first characteristic value associated with the first location mechanism of the first computing device. For example, a GPS location is obtained from the GPS location modem. In instance, the user device 12-1 obtains the GPS location from the GPS location modems of user device 12-1 to produce the first characteristic value associated with the user device 12-1. In another instance, the user device 12-2 obtains the GPS location from the GPS location modem of user device 12-2 to produce the first characteristic value associated with the user device 12-2.

A third step of the generating of the location change information includes generating the location change information of the first computing device utilizing the first characteristic value. For example, the location change information is generated to include the GPS location. In an instance, the user device 12-1 generates the LCIa to include the GPS location associated with the user device 12-1. In another instance, the user device 12-2 generates the LCIb to include the GPS location associated with the user device 12-2.

Having generated the location change information, the first computing device sends the location change information to the second computing device in accordance with the location reporting frequency of the reporting approach. For example, the user device 12-1 sends, via the wireless access device 30-1, the location change information LCIa to the control server 18-1 in accordance with the location reporting frequency associated with the user device 12-1. As another example, the user device 12-2 sends, via the wireless access device 30-2, the location change information LCIb to the control server 18-2 in accordance with the location reporting frequency associated with the user device 12-2.

The sending the location change information to the second computing device in accordance with the location reporting frequency of the reporting approach includes a series of steps. A first step includes determining a wait timeframe based on the location reporting frequency. For example, the user device 12-1 establishes a lower wait timeframe when the location reporting frequency associated with the user device 12-1 is higher. In an instance, the user device 12-1 establishes the wait timeframe as to seconds when the location reporting frequency is once every two seconds when the user device 12-1 is not associated with the trusted region #1.

As another example of the first step of sending the location change information, the user device 12-2 establishes a higher wait timeframe when the location reporting frequency associated with the user device 12-2 is lower. In an instance, the user device 12-2 establishes the wait timeframe as 10 minutes when the location reporting frequency associated with the user device 12-2 is once every 10 minutes when the user device 12-2 is associated with the trusted region #1.

A second step of sending the location change information includes facilitating transmission of the location change information to the second computing device subsequent to expiration of the wait timeframe since a previous sending of other location change information of the first computing device to the second computing device. As an example, the user device 12-2 transmits the location change information LCIb to the wireless access device 30-2 ten minutes after previously sending other location change information when the wait time frame is established as 10 minutes.

FIG. 10B further illustrates the example of the method of the communicating location change information in accordance with the reporting approach at a time t1 where the first computing device detects geo-activity change of the first computing device. For example, the user device 12-1 detects that the user device 12-1 is walking away from the trusted region #1 into the unknown region A. As another example, the user device 12-2 detects that the user device 12-2 is riding in a vehicle away from the trusted region #1 into the unknown region A.

The detecting the geo-activity change of the first computing device includes a variety of approaches. The approaches includes detecting a possible geographic region change of the first computing device. For instance, moving from the trusted region #1 to the unknown region A. The approaches further includes detecting that a current location of the first computing device is different by more than a difference threshold from a previous location of the first computing device. For instance, the first computing device moves 500 feet which is the difference threshold.

The approaches to detect the geo-activity change further includes detecting egress of the first computing device from a trusted region (e.g., moving out of the trusted region #1). The approaches further includes detecting ingress of the first computing device to another trusted region (e.g., entering trusted region #2). The approaches further includes detecting ingress of the first computing device to an untrusted region (e.g., entering the unknown region A). The approaches further includes determining a velocity change of the first computing device (e.g., moving to a higher speed, moving to a lower speed). The approaches further includes determining an acceleration change of the first computing device (e.g., rapidly speeding up, rapidly slowing down).

The approaches further includes detecting a route change of the first computing device (e.g., deviation from a predetermined navigation route).

The approaches to detect the geo-activity change further includes determining that an estimated time of arrival of the first computing device at a destination is unfavorable (e.g., arriving too early, arriving too late). The approaches further includes detecting a direction of travel change of the first computing device (e.g., a directional vector greater than 90° detected). The approaches further includes detecting an activity change of the first computing device, where the activity change is associated with movement of the first computing device. Examples of the activity change includes newly detecting at least one of resting, walking, running, bicycling, and riding in a vehicles. The approaches further includes determining that a velocity of the first computing device compares favorably to a velocity threshold (e.g., same as, higher than, less than, within a tolerance of).

Having detected the geo-activity change, the first computing device updates the reporting approach based on the geo-activity change to produce an updated location resolution level and an updated location reporting frequency. For example, the user device 12-1 generates the updated location resolution level associated with the user device 12-1 to be a higher resolution and generates the updated location reporting frequency associated with the user device 12-1 to be a lower frequency when the geo-activity change associated with the user device 12-1 indicates that the user device 12-1 is walking away from the trusted region #1 into the unknown region A. as another example, the user device 12-2 generates the updated location resolution level associated with the user device 12-2 to be a lower resolution and generates the updated location reporting frequency associated with the user device 12-2 to be a higher frequency when the geo-activity change associated with the user device 12-2 indicates that the user device 12-2 is traveling with a high velocity in a vehicle away from the trusted region #1 into the unknown region A.

The updating of the reporting approach includes a variety of ways. A first way includes generating the updated location resolution level to be greater than (e.g., more accurate resolution) the location resolution level when the geo-activity change indicates one or more of a lower velocity of the first computing device, an unfavorable route change of the first computing device, and an unfavorable direction of travel change of the first computing device. Greater resolution is further associated with the geo-activity change indicating one or more of egress of the first computing device from a trusted region, ingress of the first computing device to an untrusted region, and an unfavorable estimated time of arrival of the first computing device at a destination.

A second way of updating the reporting approach includes generating the updated location resolution level to be lower than (e.g., less accurate resolution, resolution associated with saving power) the location resolution level when the geo-activity change indicates one or more of a higher velocity of the first computing device, a favorable route change of the first computing device, and a favorable direction of travel change of the first computing device. Lower resolution is further associated with the geo-activity change indicating one or more of ingress of the first computing device to the trusted region, egress of the first computing device from the untrusted region, and a favorable estimated time of arrival of the first computing device at the destination.

A third way of updating the reporting approach includes generating the updated location reporting frequency to be greater than (e.g., more often) the location reporting frequency when the geo-activity change indicates one or more of the higher velocity of the first computing device, the unfavorable route change of the first computing device, and the unfavorable direction of travel change of the first computing device. Greater frequency is further associated with the geo-activity change indicating one or more of the egress of the first computing device from the trusted region, the ingress of the first computing device to the untrusted region, and the unfavorable estimated time of arrival of the first computing device at the destination.

A fourth way of updating the reporting approach includes generating the updated location reporting frequency to be lower than (e.g., less often) the location reporting frequency when the geo-activity change indicates one or more of the lower velocity of the first computing device, the favorable route change of the first computing device, and the favorable direction of travel change of the first computing device. Lower frequency is further associated with the geo-activity change indicating the ingress of the first computing device to the trusted region, the egress of the first computing device from the untrusted region, and the favorable estimated time of arrival of the first computing device at the destination.

Having updated the reporting approach, the first computing device generates further location change information of the first computing device in accordance with the updated location resolution level. For example, the user device 12-1 generates location change information LCIc with higher resolution when the updated location resolution level is associated with the user device 12-1 that is determined to be egressing from trusted region #1, ingressing to the unknown region A, and moving with a low velocity (e.g., walking). As another example, the user device 12-2 generates location change information LCId with lower resolution when the updated location resolution level is associated with the user device 12-2 that is determined to be egressing from trusted region #1, ingressing to the unknown region A, and moving with a high velocity (e.g., riding in a vehicle).

Having generated the further location change information, the first computing device sends the further location change information to the second computing device in accordance with the updated location reporting frequency. For example, the user device 12-1 sends, via the wireless access device 30-1, the location change information LCIc to the control server 18-1 with a lower location reporting frequency when the user device 12-1 is determined to be egressing from trusted region #1, ingressing to the unknown region A, and moving with a low velocity (e.g., walking). As another example, the user device 12-2 sends, via the wireless access device 30-2, the location change information LCId to the control server 18-2 with a higher location reporting frequency when the user device 12-2 is determined to be egressing from trusted region #1, ingressing to the unknown region A, and moving with a high velocity (e.g., riding in a vehicle).

FIG. 10C further illustrates the example of the method of the communicating location change information in accordance with the reporting approach at a time t2 where the first computing device detects geo-activity change of the first computing device. For example, both user devices 12-1 and 12-2 detect ingress trusted region #2. Having detected the geo-activity change, the first computing device updates the reporting approach based on the geo-activity change to produce an updated location resolution level and an updated location reporting frequency. For example, both user devices 12-1 and 12-2 produce an updated location resolution level that is lower and an updated location reporting frequency that is less often when ingressing the trusted region #2.

Having updated the reporting approach, the first computing device generates further location change information of the first computing device in accordance with the updated location resolution level. For example, the user device 12-1 and 12-2 utilize a wireless communication site identifier associated with the trusted region #2 as the location change information.

Having generated the further location change information, the first computing device sends the further location change information to the second computing device in accordance with the updated location reporting frequency. For example, the user device 12-1 sends, via the wireless access device 30-1, the location change information LCIe to the control server 18-1 with a lower location reporting frequency when the user device 12-1 is determined to be ingressing into trusted region #2. As another example, the user device 12-2 sends, via the wireless access device 30-2, the location change information LCIf to the control server 18-2 with a lower location reporting frequency when the user device 12-2 is determined to be ingressing into trusted region #2.

The method described above in conjunction with any module can alternatively be performed by any modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 11A:
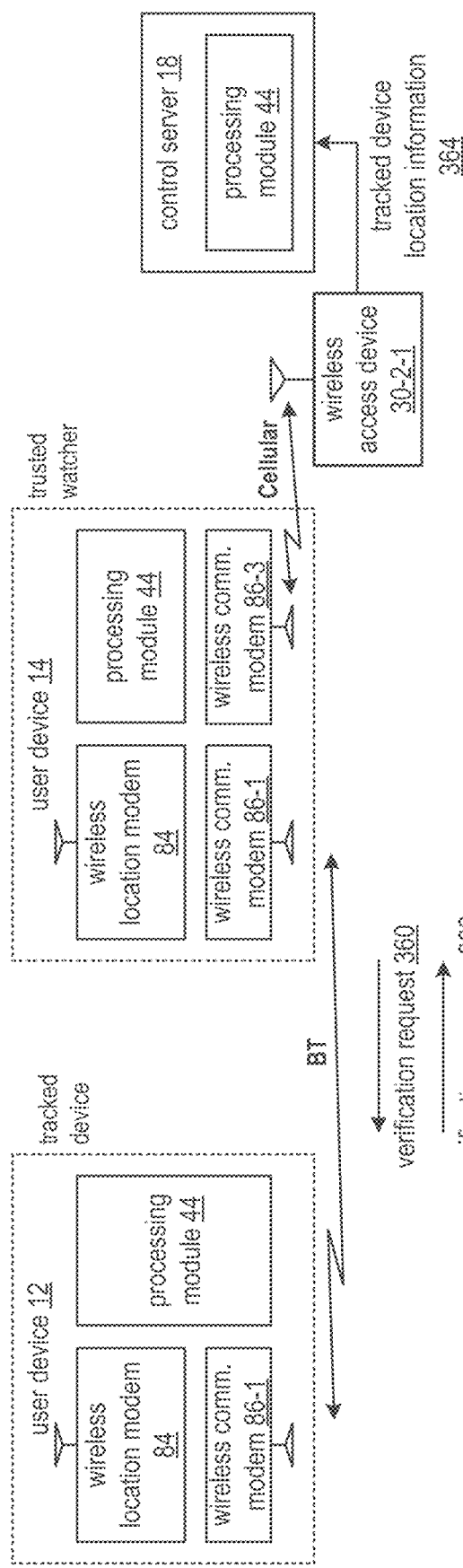
FIG. 11A is a schematic block diagram of another embodiment of a computing system in accordance with the present invention.

FIG. 11A is a schematic block diagram of another embodiment of a computing system that includes the user devices 12 and 14 of FIG. 1, the wireless access device 30-2-1 of FIG. 7A, and the control server of FIG. 1. The user device 12 includes the wireless location modem 84 and the processing module 44 of FIG. 3. The user device 12 further includes the wireless communication modem 86-1 of FIG. 7A. the user device 14 includes the wireless location modem 84 and the processing module 44 of FIG. 2. The user device 14 further includes the wireless communication modems 86-1 and 86-3 of FIG. 7A. The control server 18 includes the processing module 44 of FIG. 1.

Generally, an embodiment of this invention presents solutions where the computing system 10 supports verifying location information associated with the user device 12. The user device 12 is a tracked device, the user device 14 is a trusted watcher associated with the tracked device, and the control server 18 is a location information recipient.

In an example of operation of the verifying of the location information, the processing module 44 of the user device 14 determines trusted watcher location information for the user device 14. For example, the processing module 44 interprets an output from the wireless location modem 84 of the user device 14 to produce the trusted watcher location information (e.g., GPS coordinates).

Having determined the trusted watcher location information, the processing module 44 of the user device 14 issues a trusted watcher location information verification request to the tracked device, where the trusted watcher location information verification request includes the trusted watcher location information. For example, the processing module 44 generates the trusted watcher location information verification request to include the trusted watcher location information. The request further includes a request for verification and includes, when the trusted watcher location information is not verified, a request for tracked device location that is generated by the tracked device based on an output from the wireless location modem 84 of the user device 12. The issuing further includes facilitating sending, via the wireless communication modem 86-1, the trusted watcher location information verification request 360 to the tracked device, i.e., user device 12.

Having issued the trusted watcher location information verification request to the tracked device, when the trusted watcher location information is verified by the tracked device, the user device 14 generates tracked device location information based on the verified trusted watcher location information. For example, the processing module 44 of the user device 14 interprets the verification response 362 received, via the wireless communication modem 86-1 from the user device 12, and interprets a verification indicator. When verified, the processing module 44 generates the tracked device location information using the trusted watcher location information.

On the other hand, when the trusted watcher location information is not verified by the tracked device, the user device 14 obtains the tracked device location information from the tracked device. For example, the processing module 44 of the user device 14 extracts the tracked device location information from the verification response 362.

Having obtained the tracked device location information, the trusted watcher sends the tracked device location information to the location information recipient. For example, the processing module 44 of the user device 14 facilitates transmission, via the wireless location modem 86-3, the tracked device location information 364 to the processing module 44 of the control server 18.

Figure 11B:
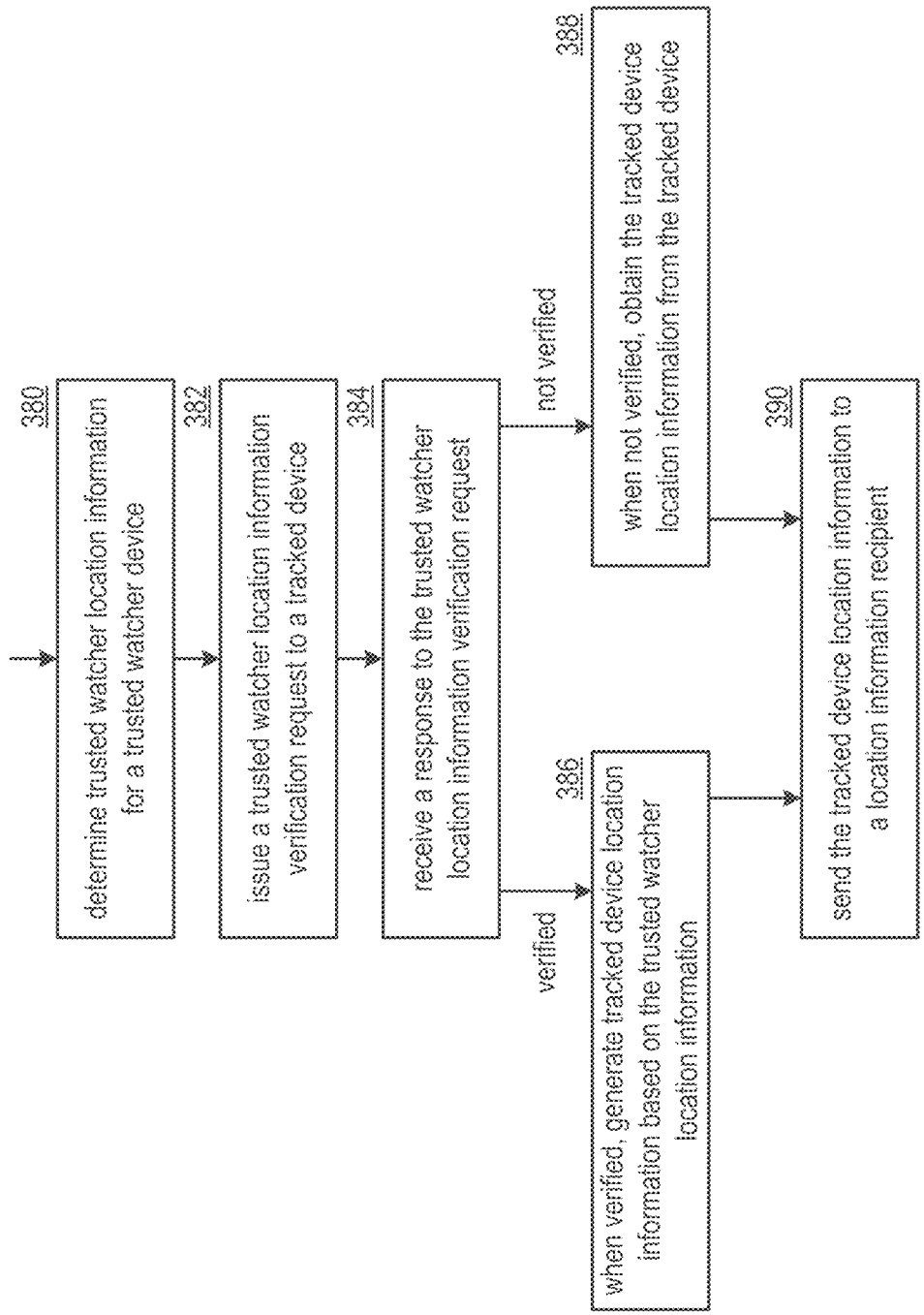
FIG. 11B is a logic diagram of an embodiment of a method of verifying location information in a computing system in accordance with the present invention.

FIG. 11B is a logic diagram of an embodiment of a method of verifying location information within a computing system. In particular, a method is presented for use in conjunction with one or more functions and features described in conjunction with FIGS. 1-6, and also FIG. 11A. The method includes step 380 where a processing module of one or more processing modules of one or more computing devices of the computing system determines trusted watcher location information for a trusted watcher device. For example, the processing module interprets an output from a GPS receiver associated with the trusted watcher device to produce the trusted watcher location information.

The method continues at step 382 where the processing module issues a trusted watcher location information verification request to tracked device, where the trusted watcher location information verification request includes the trusted watcher location information. For example, the processing module generates the trusted watcher location information verification request to include the trusted watcher information and a request for verification. The request further includes a request for tracked device location information when the trusted watcher location information compares unfavorably to the tracked device location information (e.g., not verified). The tracked device generates the tracked device location information indicating location information associated with the tracked device.

The method continues at step 384 the processing module receives a response to the trusted watcher location information verification request. For example, the processing module receives a response that indicates that the trusted watcher location information is verified when the trusted watcher location information compares favorably to the tracked device location information. As another example, the processing module receives another response that indicates that the trusted watcher location information is not verified when the other response includes the tracked device location information that is generated by the tracked device. The method branches to step 388 when the trusted watcher location information is not verified. The method continues to step 386 when the trusted watcher location information is verified.

When the trusted watcher location information is verified, the method continues at step 386 where the processing module generates tracked device location information based on the trusted watcher location information. For example, the processing module interprets the response from the tracked device to identify a verification indicator and when verified, generates the tracked device location information using the trusted watcher location information. The method branches to step 390.

When the trusted watcher location information is not verified, the method continues at step 388 where the processing module obtains the tracked device location information from the tracked device. For example, the processing module extracts the tracked device location information from the response. As another example, the processing module issues a further request to the tracked device to request the tracked device location information and receives another response that includes the tracked device location information. As yet another example, the processing module updates the trusted watcher location information in accordance with one or more error indicators extracted from the response from the tracked device, where an error indicator identifies a particular portion of the trusted watcher location information but is not substantially match the tracked device location information and further indicates a recommended amendment to the portion of the trusted watcher location information.

The method continues at step 390 where the processing module sends the tracked device location information to a location information recipient. For example, the processing module facilitates transmission of the tracked device location information to the location information recipient. Alternatively, or in addition to, the processing module sends the tracked device location information to the tracked device for yet another confirmation cycle as described above.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   generating, by a first computing device, location change information of the first computing device in accordance with a location resolution level of a reporting approach, wherein the location change information includes one or more characteristic values of one or more location mechanisms, wherein the one or more location mechanisms includes a wireless communication link, an altimeter sensor output, an accelerometer sensor output, a barometer sensor output, a temperature sensor output, an image sensor output, a global positioning satellite (GPS) location modem output, and a user interface output, wherein the one or more characteristic values includes a sensor output value, a wireless device pairing status, a wireless link connectivity status, a paired wireless device identifier (ID), a wireless signal level, a wireless link error rate, a wireless site ID, a wireless frequency, a wireless link beacon ID, a GPS location, an associated geographic region ID, and a status of the first computing device;
   sending, by the first computing device, the location change information to a second computing device in accordance with a location reporting frequency of the reporting approach;
   detecting, by the first computing device, geo-activity change of the first computing device;
   updating, by the first computing device, the reporting approach based on the geo-activity change to produce an updated location resolution level and an updated location reporting frequency, wherein the updating the reporting approach to produce the updated location resolution level includes one or more of:
      generating the updated location resolution level to be greater than the location resolution level when the geo-activity change indicates one or more of:
         a lower velocity of the first computing device,
         an unfavorable route change of the first computing device,
         an unfavorable direction of travel change of the first computing device,
         egress of the first computing device from a trusted region,
         ingress of the first computing device to an untrusted region, and
         an unfavorable estimated time of arrival of the first computing device at a destination, and
      generating the updated location resolution level to be lower than the location resolution level when the geo-activity change indicates one or more of:
         a higher velocity of the first computing device,
         a favorable route change of the first computing device,
         a favorable direction of travel change of the first computing device,
         ingress of the first computing device to the trusted region,
         egress of the first computing device from the untrusted region, and
         a favorable estimated time of arrival of the first computing device at the destination,
   wherein the updating the reporting approach to produce the updated location reporting frequency includes one or more of:
      generating the updated location reporting frequency to be greater than the location reporting frequency when the geo-activity change indicates one or more of:
         the higher velocity of the first computing device,
         the unfavorable route change of the first computing device,
         the unfavorable direction of travel change of the first computing device,
         the egress of the first computing device from the trusted region,
         the ingress of the first computing device to the untrusted region, and
         the unfavorable estimated time of arrival of the first computing device at the destination, and
      generating the updated location reporting frequency to be lower than the location reporting frequency when the geo-activity change indicates one or more of:
         the lower velocity of the first computing device,
         the favorable route change of the first computing device,
         the favorable direction of travel change of the first computing device,
         the ingress of the first computing device to the trusted region,
         the egress of the first computing device from the untrusted region, and
         the favorable estimated time of arrival of the first computing device at the destination;
   generating, by the first computing device, further location change information of the first computing device in accordance with the updated location resolution level; and
   sending, by the first computing device, the further location change information to the second computing device in accordance with the updated location reporting frequency.

2. The method of claim 1, wherein the generating the location change information of the first computing device in accordance with the location resolution level of the reporting approach comprises:

selecting a first location mechanism of the first computing device based on the location resolution level;
obtaining a first characteristic value associated with the first location mechanism of the first computing device; and
generating the location change information of the first computing device utilizing the first characteristic value.

3. The method of claim 1, wherein the sending the location change information to the second computing device in accordance with the location reporting frequency of the reporting approach comprises:
determining a wait timeframe based on the location reporting frequency; and
facilitating transmission of the location change information to the second computing device subsequent to expiration of the wait timeframe since a previous sending of other location change information of the first computing device to the second computing device.

4. The method of claim 1, wherein the detecting the geo-activity change of the first computing device comprises one or more of:
detecting a possible geographic region change of the first computing device;
detecting that a current location of the first computing device is different by more than a difference threshold from a previous location of the first computing device;
detecting the egress of the first computing device from the trusted region;
detecting ingress of the first computing device to another trusted region;
detecting the ingress of the first computing device to the untrusted region;
determining a velocity change of the first computing device;
determining an acceleration change of the first computing device;
detecting a route change of the first computing device;
determining that an estimated time of arrival of the first computing device at the destination is unfavorable;
detecting a direction of travel change of the first computing device;
detecting an activity change of the first computing device, wherein the activity change is associated with movement of the first computing device; and
determining that a velocity of the first computing device compares favorably to a velocity threshold.

5. A computing device of a computing system, the computing device comprises:
an interface;
a local memory; and
a processing module operably coupled to the interface and the local memory, wherein the processing module functions to:
generate location change information of the computing device in accordance with a location resolution level of a reporting approach, wherein the location change information includes one or more characteristic values of one or more location mechanisms, wherein the one or more location mechanisms includes a wireless communication link, an altimeter sensor output, an accelerometer sensor output, a barometer sensor output, a temperature sensor output, an image sensor output, a global positioning satellite (GPS) location modem output, and a user interface output, wherein the one or more characteristic values includes a sensor output value, a wireless device pairing status, a wireless link connectivity status, a paired wireless device identifier (ID), a wireless signal level, a wireless link error rate, a wireless site ID, a wireless frequency, a wireless link beacon ID, a GPS location, an associated geographic region ID, and a status of the computing device;
send, via the interface, the location change information to another computing device in accordance with a location reporting frequency of the reporting approach;
detect geo-activity change of the computing device;
update the reporting approach based on the geo-activity change to produce an updated location resolution level and an updated location reporting frequency,
wherein the processing module functions to update the reporting approach to produce the updated location resolution by one or more of:
generating the updated location resolution level to be greater than the location resolution level when the geo-activity change indicates one or more of:
a lower velocity of the computing device,
an unfavorable route change of the computing device,
an unfavorable direction of travel change of the computing device,
egress of the computing device from a trusted region,
ingress of the computing device to an untrusted region, and
an unfavorable estimated time of arrival of the computing device at a destination, and
generating the updated location resolution level to be lower than the location resolution level when the geo-activity change indicates one or more of:
a higher velocity of the computing device,
a favorable route change of the computing device,
a favorable direction of travel change of the computing device,
ingress of the computing device to the trusted region,
egress of the computing device from the untrusted region, and
a favorable estimated time of arrival of the computing device at the destination,
wherein the processing module functions to update the reporting approach to produce the updated location reporting frequency by one or more of:
generating the updated location reporting frequency to be greater than the location reporting frequency when the geo-activity change indicates one or more of:
the higher velocity of the computing device,
the unfavorable route change of the computing device,
the unfavorable direction of travel change of the computing device,
the egress of the computing device from the trusted region,
the ingress of the computing device to the untrusted region, and
the unfavorable estimated time of arrival of the computing device at the destination, and
generating the updated location reporting frequency to be lower than the location reporting frequency when the geo-activity change indicates one or more of:
the lower velocity of the computing device, the favorable route change of the computing device,
the favorable direction of travel change of the computing device,
the ingress of the computing device to the trusted region,
the egress of the computing device from the untrusted region, and
the favorable estimated time of arrival of the computing device at the destination;
generate further location change information of the computing device in accordance with the updated location resolution level; and
send, via the interface, the further location change information to the other computing device in accordance with the updated location reporting frequency.

6. The computing device of claim 5, wherein the processing module functions to generate the location change information of the computing device in accordance with the location resolution level of the reporting approach by:
selecting a first location mechanism of the computing device based on the location resolution level;
obtaining a first characteristic value associated with the first location mechanism of the computing device; and
generating the location change information of the computing device utilizing the first characteristic value.

7. The computing device of claim 5, wherein the processing module functions to send the location change information to the other computing device in accordance with the location reporting frequency of the reporting approach by:
determining a wait timeframe based on the location reporting frequency; and
facilitating transmission, via the interface, of the location change information to the other computing device subsequent to expiration of the wait timeframe since a previous sending of other location change information of the computing device to the other computing device.

8. The computing device of claim 5, wherein the processing module functions to detect the geo-activity change of the computing device by one or more of:
detecting a possible geographic region change of the computing device;
detecting that a current location of the computing device is different by more than a difference threshold from a previous location of the computing device;
detecting the egress of the computing device from the trusted region;
detecting ingress of the computing device to another trusted region;
detecting the ingress of the computing device to the untrusted region;
determining a velocity change of the computing device;
determining an acceleration change of the computing device;
detecting a route change of the computing device;
determining that an estimated time of arrival of the computing device at the destination is unfavorable;
detecting a direction of travel change of the computing device;
detecting an activity change of the computing device, wherein the activity change is associated with movement of the computing device; and
determining that a velocity of the computing device compares favorably to a velocity threshold.

9. A non-transitory computer readable memory comprises:
a first memory element that stores operational instructions that, when executed by a processing module, causes the processing module to:
generate location change information of a computing device in accordance with a location resolution level of a reporting approach, wherein the location change information includes one or more characteristic values of one or more location mechanisms, wherein the one or more location mechanisms includes a wireless communication link, an altimeter sensor output, an accelerometer sensor output, a barometer sensor output, a temperature sensor output, an image sensor output, a global positioning satellite (GPS) location modem output, and a user interface output, wherein the one or more characteristic values includes a sensor output value, a wireless device pairing status, a wireless link connectivity status, a paired wireless device identifier (ID), a wireless signal level, a wireless link error rate, a wireless site ID, a wireless frequency, a wireless link beacon ID, a GPS location, an associated geographic region ID, and a status of the computing device;
a second memory element that stores operational instructions that, when executed by the processing module, causes the processing module to:
send the location change information to another computing device in accordance with a location reporting frequency of the reporting approach;
a third memory element that stores operational instructions that, when executed by the processing module, causes the processing module to:
detect geo-activity change of the computing device;
a fourth memory element that stores operational instructions that, when executed by the processing module, causes the processing module to:
update the reporting approach based on the geo-activity change to produce an updated location resolution level and an updated location reporting frequency,
wherein the processing module functions to update the reporting approach to produce the updated location resolution by one or more of:
generating the updated location resolution level to be greater than the location resolution level when the geo-activity change indicates one or more of:
a lower velocity of the computing device,
an unfavorable route change of the computing device,
an unfavorable direction of travel change of the computing device,
egress of the computing device from a trusted region,
ingress of the computing device to an untrusted region, and
an unfavorable estimated time of arrival of the computing device at a destination, and
generating the updated location resolution level to be lower than the location resolution level when the geo-activity change indicates one or more of:
a higher velocity of the computing device,
a favorable route change of the computing device,
a favorable direction of travel change of the computing device,
ingress of the computing device to the trusted region,
egress of the computing device from the untrusted region, and a favorable estimated time of arrival of the computing device at the destination,
wherein the processing module functions to update the reporting approach to produce the updated location reporting frequency by one or more of:
generating the updated location reporting frequency to be greater than the location reporting frequency when the geo-activity change indicates one or more of:
the higher velocity of the computing device,
the unfavorable route change of the computing device,
the unfavorable direction of travel change of the computing device,
the egress of the computing device from the trusted region,
the ingress of the computing device to the untrusted region, and
the unfavorable estimated time of arrival of the computing device at the destination, and
generating the updated location reporting frequency to be lower than the location reporting frequency when the geo-activity change indicates one or more of:
the lower velocity of the computing device,
the favorable route change of the computing device,
the favorable direction of travel change of the computing device,
the ingress of the computing device to the trusted region,
the egress of the computing device from the untrusted region, and
the favorable estimated time of arrival of the computing device at the destination;
a fifth memory element that stores operational instructions that, when executed by the processing module, causes the processing module to:
generate further location change information of the computing device in accordance with the updated location resolution level; and
a sixth memory element that stores operational instructions that, when executed by the processing module, causes the processing module to:
send the further location change information to the other computing device in accordance with the updated location reporting frequency.

10. The non-transitory computer readable memory of claim 9, wherein the processing module functions to execute the operational instructions stored by the first memory element to cause the processing module to generate the location change information of the computing device in accordance with the location resolution level of the reporting approach by one or more of:
selecting a first location mechanism of the computing device based on the location resolution level;
obtaining a first characteristic value associated with the first location mechanism of the computing device; and
generating the location change information of the computing device utilizing the first characteristic value.

11. The non-transitory computer readable memory of claim 9, wherein the processing module functions to execute the operational instructions stored by the second memory element to cause the processing module to send the location change information to the other computing device in accordance with the location reporting frequency of the reporting approach by:
determining a wait timeframe based on the location reporting frequency; and
facilitating transmission of the location change information to the other computing device subsequent to expiration of the wait timeframe since a previous sending of other location change information of the computing device to the other computing device.

12. The non-transitory computer readable memory of claim 9, wherein the processing module functions to execute the operational instructions stored by the third memory element to cause the processing module to detect the geo-activity change of the computing device by one or more of:
detecting a possible geographic region change of the computing device;
detecting that a current location of the computing device is different by more than a difference threshold from a previous location of the computing device;
detecting the egress of the computing device from the trusted region;
detecting ingress of the computing device to another trusted region;
detecting the ingress of the computing device to the untrusted region;
determining a velocity change of the computing device;
determining an acceleration change of the computing device;
detecting a route change of the computing device;
determining that an estimated time of arrival of the computing device at the destination is unfavorable;
detecting a direction of travel change of the computing device;
detecting an activity change of the computing device, wherein the activity change is associated with movement of the computing device; and
determining that a velocity of the computing device compares favorably to a velocity threshold.

* * * * *